US009685782B2

United States Patent
Blackwell, Jr. et al.

(10) Patent No.: US 9,685,782 B2
(45) Date of Patent: Jun. 20, 2017

(54) POWER DISTRIBUTION MODULE(S) CAPABLE OF HOT CONNECTION AND/OR DISCONNECTION FOR DISTRIBUTED ANTENNA SYSTEMS, AND RELATED POWER UNITS, COMPONENTS, AND METHODS

(71) Applicant: Corning Optical Communications LLC, Hickory, NC (US)

(72) Inventors: Chois Alven Blackwell, Jr., North Richland Hills, TX (US); Boyd Grant Brower, Keller, TX (US); Terry Dean Cox, Fort Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 832 days.

(21) Appl. No.: 13/899,118

(22) Filed: May 21, 2013

(65) Prior Publication Data

US 2013/0249292 A1  Sep. 26, 2013

Related U.S. Application Data

(63) Continuation of application No. PCT/US2011/061761, filed on Nov. 22, 2011.
(Continued)

(51) Int. Cl.
*H02J 3/00*      (2006.01)
*H04B 10/2575*   (2013.01)
(Continued)

(52) U.S. Cl.
CPC .......... *H02J 3/00* (2013.01); *H04B 10/25753* (2013.01); *H04B 10/25758* (2013.01);
(Continued)

(58) Field of Classification Search
None
See application file for complete search history.

(56) References Cited

U.S. PATENT DOCUMENTS 4,449,246 A   5/1984   Seiler et al.
4,665,560 A   5/1987   Lange
(Continued)

FOREIGN PATENT DOCUMENTS

CN   101030162 A   9/2007
CN   101232179 A   7/2008
(Continued)

OTHER PUBLICATIONS

International Search Report for PCT/US2010/056458 mailed Aug. 2, 2011, 4 pages.
(Continued)

*Primary Examiner* — Jared Fureman
*Assistant Examiner* — Aqeel Bukhari
(74) *Attorney, Agent, or Firm* — C. Keith Montgomery, Esq.

(57) ABSTRACT

Power distribution modules capable of "hot" connection and/or disconnection in distributed antenna systems (DAS), and related components, power units, and methods are disclosed. The power distribution modules are configured to distribute power to a power-consuming DAS component(s), such as a remote antenna unit(s) (RAU(s)). By "hot" connection and/or disconnection, it is meant that the power distribution modules can be connected and/or disconnected from a power unit and/or a power-consuming DAS component(s) while power is being provided to the power distribution modules. Power is not required to be disabled in the power unit before connection and/or disconnection of power distribution modules. As a non-limiting example, the power distribution modules may be configured to protect against or
(Continued)

reduce electrical arcing or electrical contact erosion that may otherwise result from "hot" connection and/or connection of the power distribution modules.

21 Claims, 16 Drawing Sheets

Related U.S. Application Data

(60) Provisional application No. 61/416,780, filed on Nov. 24, 2010.

(51) Int. Cl.
H04B 10/80 (2013.01)
H04L 12/413 (2006.01)

(52) U.S. Cl.
CPC ......... *H04B 10/808* (2013.01); *H04L 12/413* (2013.01); *Y10T 307/406* (2015.04)

(56) References Cited

U.S. PATENT DOCUMENTS

| | | |
|---|---|---|
| 4,939,852 A | 7/1990 | Brenner |
| 4,972,346 A | 11/1990 | Kawano et al. |
| 5,056,109 A | 10/1991 | Gilhousen et al. |
| 5,138,679 A | 8/1992 | Edwards et al. |
| 5,187,803 A | 2/1993 | Sohner et al. |
| 5,206,655 A | 4/1993 | Caille et al. |
| 5,208,812 A | 5/1993 | Dudek et al. |
| 5,278,989 A | 1/1994 | Burke et al. |
| 5,280,472 A | 1/1994 | Gilhousen et al. |
| 5,329,604 A | 7/1994 | Baldwin et al. |
| 5,381,459 A | 1/1995 | Lappington |
| 5,396,224 A | 3/1995 | Dukes et al. |
| 5,420,863 A | 5/1995 | Taketsugu et al. |
| 5,432,838 A | 7/1995 | Purchase et al. |
| 5,436,827 A | 7/1995 | Gunn et al. |
| 5,519,830 A | 5/1996 | Opoczynski |
| 5,534,854 A | 7/1996 | Bradbury et al. |
| 5,559,831 A | 9/1996 | Keith |
| 5,598,314 A | 1/1997 | Hall |
| 5,606,725 A | 2/1997 | Hart |
| 5,668,562 A | 9/1997 | Cutrer et al. |
| 5,682,256 A | 10/1997 | Motley et al. |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,802,173 A | 9/1998 | Hamilton-Piercy et al. |
| 5,809,395 A | 9/1998 | Hamilton-Piercy et al. |
| 5,809,431 A | 9/1998 | Bustamante et al. |
| 5,818,883 A | 10/1998 | Smith et al. |
| 5,839,052 A | 11/1998 | Dean et al. |
| 5,862,460 A | 1/1999 | Rich |
| 5,867,763 A | 2/1999 | Dean et al. |
| 5,889,469 A | 3/1999 | Mykytiuk et al. |
| 5,953,670 A | 9/1999 | Newson |
| 5,969,837 A | 10/1999 | Farber et al. |
| 5,983,070 A | 11/1999 | Georges et al. |
| 6,006,069 A | 12/1999 | Langston |
| 6,011,980 A | 1/2000 | Nagano et al. |
| 6,014,546 A | 1/2000 | Georges et al. |
| 6,037,898 A | 3/2000 | Parish et al. |
| 6,060,879 A | 5/2000 | Mussenden |
| 6,069,721 A | 5/2000 | Oh et al. |
| 6,118,767 A | 9/2000 | Shen et al. |
| 6,122,529 A | 9/2000 | Sabat, Jr. et al. |
| 6,125,048 A | 9/2000 | Loughran et al. |
| 6,128,477 A | 10/2000 | Freed |
| 6,157,810 A | 12/2000 | Georges et al. |
| 6,163,266 A | 12/2000 | Fasullo et al. |
| 6,188,876 B1 | 2/2001 | Kim |
| 6,192,216 B1 | 2/2001 | Sabat, Jr. et al. |
| 6,194,968 B1 | 2/2001 | Winslow |
| 6,212,274 B1 | 4/2001 | Ninh |
| 6,212,397 B1 | 4/2001 | Langston et al. |
| 6,222,503 B1 | 4/2001 | Gietema |
| 6,223,201 B1 | 4/2001 | Reznak |
| 6,236,863 B1 | 5/2001 | Waldroup et al. |
| 6,275,990 B1 | 8/2001 | Dapper et al. |
| 6,279,158 B1 | 8/2001 | Geile et al. |
| 6,295,451 B1 | 9/2001 | Mimura |
| 6,307,869 B1 | 10/2001 | Pawelski |
| 6,317,599 B1 | 11/2001 | Rappaport et al. |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,340,932 B1 | 1/2002 | Rodgers et al. |
| 6,353,600 B1 | 3/2002 | Schwartz et al. |
| 6,366,774 B1 | 4/2002 | Ketonen et al. |
| 6,370,203 B1 | 4/2002 | Boesch et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,405,018 B1 | 6/2002 | Reudink et al. |
| 6,415,132 B1 | 7/2002 | Sabat, Jr. |
| 6,421,327 B1 | 7/2002 | Lundby |
| 6,448,558 B1 | 9/2002 | Greene |
| 6,452,915 B1 | 9/2002 | Jorgensen |
| 6,480,702 B1 | 11/2002 | Sabat, Jr. |
| 6,496,290 B1 | 12/2002 | Lee |
| 6,519,449 B1 | 2/2003 | Zhang et al. |
| 6,535,330 B1 | 3/2003 | Lelic et al. |
| 6,535,720 B1 | 3/2003 | Kintis et al. |
| 6,551,065 B2 | 4/2003 | Lee |
| 6,580,402 B2 | 6/2003 | Navarro et al. |
| 6,580,905 B1 | 6/2003 | Naidu et al. |
| 6,587,514 B1 | 7/2003 | Wright et al. |
| 6,588,943 B1 | 7/2003 | Howard |
| 6,598,009 B2 | 7/2003 | Yang |
| 6,615,074 B2 | 9/2003 | Mickle et al. |
| 6,628,732 B1 | 9/2003 | Takaki |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,678,509 B2 | 1/2004 | Skarman et al. |
| 6,704,298 B1 | 3/2004 | Matsumiya et al. |
| 6,745,013 B1 | 6/2004 | Porter et al. |
| 6,763,226 B1 | 7/2004 | McZeal, Jr. |
| 6,785,558 B1 | 8/2004 | Stratford et al. |
| 6,801,767 B1 | 10/2004 | Schwartz et al. |
| 6,823,174 B1 | 11/2004 | Masenten et al. |
| 6,826,163 B2 | 11/2004 | Mani et al. |
| 6,836,660 B1 | 12/2004 | Wala |
| 6,836,673 B1 | 12/2004 | Trott |
| 6,842,433 B2 | 1/2005 | West et al. |
| 6,850,510 B2 | 2/2005 | Kubler |
| 6,876,056 B2 | 4/2005 | Tilmans et al. |
| 6,882,311 B2 | 4/2005 | Walker et al. |
| 6,885,344 B2 | 4/2005 | Mohamadi |
| 6,919,858 B2 | 7/2005 | Rofougaran |
| 6,931,659 B1 | 8/2005 | Kinemura |
| 6,934,511 B1 | 8/2005 | Lovinggood et al. |
| 6,934,541 B2 | 8/2005 | Miyatani |
| 6,941,112 B2 | 9/2005 | Hasegawa |
| 6,961,312 B2 | 11/2005 | Kubler et al. |
| 6,977,502 B1 | 12/2005 | Hertz |
| 6,984,073 B2 | 1/2006 | Cox |
| 7,015,826 B1 | 3/2006 | Chan et al. |
| 7,020,488 B1 | 3/2006 | Bleile et al. |
| 7,024,166 B2 | 4/2006 | Wallace |
| 7,039,399 B2 | 5/2006 | Fischer |
| 7,043,271 B1 | 5/2006 | Seto et al. |
| 7,050,017 B2 | 5/2006 | King et al. |
| 7,053,838 B2 | 5/2006 | Judd |
| 7,069,577 B2 | 6/2006 | Geile et al. |
| 7,072,586 B2 | 7/2006 | Aburakawa et al. |
| 7,073,953 B2 | 7/2006 | Roth et al. |

(56) References Cited

U.S. PATENT DOCUMENTS

| | | |
|---|---|---|
| 7,103,119 B2 | 9/2006 | Matsuoka et al. |
| 7,103,377 B2 | 9/2006 | Bauman et al. |
| 7,110,795 B2 | 9/2006 | Doi |
| 7,142,125 B2 | 11/2006 | Larson et al. |
| 7,142,535 B2 | 11/2006 | Kubler et al. |
| 7,142,619 B2 | 11/2006 | Sommer et al. |
| 7,144,255 B2 | 12/2006 | Seymour .................. 439/49 |
| 7,171,244 B2 | 1/2007 | Bauman |
| 7,177,728 B2 | 2/2007 | Gardner |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,269,311 B2 | 9/2007 | Kim et al. ............... 385/24 |
| 7,315,735 B2 | 1/2008 | Graham |
| 7,359,647 B1 | 4/2008 | Faria et al. |
| 7,359,674 B2 | 4/2008 | Markki et al. |
| 7,366,151 B2 | 4/2008 | Kubler et al. |
| 7,369,526 B2 | 5/2008 | Lechleider et al. |
| 7,388,892 B2 | 6/2008 | Nishiyama et al. ....... 372/38.02 |
| 7,392,025 B2 | 6/2008 | Rooyen et al. |
| 7,412,224 B2 | 8/2008 | Kotola et al. |
| 7,450,853 B2 | 11/2008 | Kim et al. |
| 7,451,365 B2 | 11/2008 | Wang et al. |
| 7,454,171 B2 | 11/2008 | Palin et al. |
| 7,460,507 B2 | 12/2008 | Kubler et al. |
| 7,469,105 B2 | 12/2008 | Wake et al. |
| 7,483,711 B2 | 1/2009 | Burchfiel |
| 7,486,782 B1 | 2/2009 | Roos |
| 7,505,747 B2 | 3/2009 | Solum |
| 7,512,419 B2 | 3/2009 | Solum |
| 7,515,526 B2 * | 4/2009 | Elkayam ............. H04L 12/10 370/217 |
| 7,526,303 B2 | 4/2009 | Chary |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,551,641 B2 | 6/2009 | Pirzada et al. |
| 7,557,758 B2 | 7/2009 | Rofougaran |
| 7,567,579 B2 | 7/2009 | Korcharz et al. |
| 7,580,384 B2 | 8/2009 | Kubler et al. |
| 7,585,119 B2 | 9/2009 | Sasaki |
| 7,586,861 B2 | 9/2009 | Kubler et al. |
| 7,587,559 B2 | 9/2009 | Brittain et al. |
| 7,599,420 B2 | 10/2009 | Forenza et al. |
| 7,610,046 B2 | 10/2009 | Wala |
| 7,619,535 B2 | 11/2009 | Chen et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,809,012 B2 | 10/2010 | Ruuska et al. |
| 7,812,766 B2 | 10/2010 | Leblanc et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,852,228 B2 | 12/2010 | Teng et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,970,428 B2 | 6/2011 | Lin et al. |
| 7,990,925 B2 | 8/2011 | Tinnakornsrisuphap et al. |
| 7,996,020 B1 | 8/2011 | Chhabra |
| 8,001,397 B2 | 8/2011 | Hansalia |
| 8,018,907 B2 | 9/2011 | Kubler et al. |
| 8,036,157 B2 | 10/2011 | Hanabusa et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,155,525 B2 | 4/2012 | Cox |
| 8,270,838 B2 | 9/2012 | Cox |
| 8,270,990 B2 | 9/2012 | Zhao |
| 8,306,563 B2 | 11/2012 | Zavadsky et al. |
| 8,328,145 B2 | 12/2012 | Smith |
| 8,406,941 B2 | 3/2013 | Smith |
| 8,417,979 B2 | 4/2013 | Maroney |
| 8,457,562 B2 | 6/2013 | Zavadsky et al. |
| 8,514,092 B2 | 8/2013 | Cao et al. |
| 8,532,492 B2 | 9/2013 | Palanisamy et al. |
| 8,548,330 B2 | 10/2013 | Berlin et al. |
| 8,588,614 B2 | 11/2013 | Larsen |
| 8,620,375 B2 | 12/2013 | Kim et al. |
| 8,622,632 B2 | 1/2014 | Isenhour et al. |
| 8,649,684 B2 | 2/2014 | Casterline et al. |
| 8,744,390 B2 | 6/2014 | Stratford |
| 8,830,035 B2 | 9/2014 | Lindley et al. |
| 8,831,428 B2 | 9/2014 | Kobyakov et al. |
| 8,831,593 B2 | 9/2014 | Melester et al. |
| 8,855,832 B2 | 10/2014 | Rees |
| 8,930,736 B2 | 1/2015 | James |
| 8,971,903 B2 | 3/2015 | Hossain et al. |
| 8,994,276 B2 | 3/2015 | Recker et al. |
| 9,026,036 B2 | 5/2015 | Saban et al. |
| 9,160,449 B2 | 10/2015 | Heidler et al. |
| 9,166,690 B2 | 10/2015 | Brower et al. |
| 9,223,336 B2 | 12/2015 | Petersen et al. |
| 9,343,797 B2 | 5/2016 | Shoemaker et al. |
| 2001/0036199 A1 | 11/2001 | Terry |
| 2002/0051434 A1 | 5/2002 | Ozluturk et al. |
| 2002/0097031 A1 | 7/2002 | Cook et al. |
| 2002/0123365 A1 | 9/2002 | Thorson et al. |
| 2002/0180554 A1 | 12/2002 | Clark et al. |
| 2003/0111909 A1 * | 6/2003 | Liu .................. H02J 1/102 307/64 |
| 2003/0146765 A1 | 8/2003 | Darshan et al. |
| 2003/0147353 A1 | 8/2003 | Clarkson et al. |
| 2004/0095907 A1 | 5/2004 | Agee et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0165573 A1 | 8/2004 | Kubler et al. |
| 2004/0203704 A1 | 10/2004 | Ommodt et al. |
| 2004/0230846 A1 | 11/2004 | Mancey et al. |
| 2005/0047030 A1 | 3/2005 | Lee |
| 2005/0147071 A1 | 7/2005 | Karaoguz et al. |
| 2005/0226625 A1 | 10/2005 | Wake et al. |
| 2005/0272439 A1 | 12/2005 | Picciriello et al. |
| 2006/0053324 A1 | 3/2006 | Giat et al. |
| 2006/0084379 A1 | 4/2006 | O'Neill |
| 2006/0192434 A1 | 8/2006 | Vrla et al. |
| 2006/0274704 A1 | 12/2006 | Desai et al. |
| 2007/0004467 A1 | 1/2007 | Chary |
| 2007/0058332 A1 | 3/2007 | Canterbury et al. |

(56) References Cited

U.S. PATENT DOCUMENTS

| | | |
|---|---|---|
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0166050 A1 | 7/2007 | Horio et al. |
| 2007/0224954 A1 | 9/2007 | Gopi |
| 2007/0286599 A1 | 12/2007 | Sauer et al. |
| 2007/0291732 A1 | 12/2007 | Todd et al. |
| 2007/0297005 A1 | 12/2007 | Montierth et al. |
| 2008/0002614 A1 | 1/2008 | Hanabusa et al. |
| 2008/0043714 A1 | 2/2008 | Pernu |
| 2008/0044186 A1 | 2/2008 | George et al. |
| 2008/0045271 A1 | 2/2008 | Azuma |
| 2008/0070502 A1 | 3/2008 | George et al. ............... 455/41.2 |
| 2008/0080863 A1 | 4/2008 | Sauer et al. ..................... 398/70 |
| 2008/0098203 A1 | 4/2008 | Master et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0164890 A1 | 7/2008 | Admon et al. |
| 2008/0166094 A1 | 7/2008 | Bookbinder et al. |
| 2008/0167931 A1 | 7/2008 | Gerstemeier et al. |
| 2008/0186143 A1 | 8/2008 | George et al. |
| 2008/0207253 A1 | 8/2008 | Jaakkola et al. |
| 2008/0251071 A1 | 10/2008 | Armitstead et al. |
| 2008/0252307 A1 | 10/2008 | Schindler |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0272725 A1 | 11/2008 | Bojrup et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2009/0007192 A1 | 1/2009 | Singh |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0040027 A1 | 2/2009 | Nakao |
| 2009/0055672 A1 | 2/2009 | Burkland et al. |
| 2009/0059903 A1 | 3/2009 | Kubler et al. |
| 2009/0061796 A1 | 3/2009 | Arkko et al. |
| 2009/0073916 A1 | 3/2009 | Zhang et al. |
| 2009/0100275 A1 | 4/2009 | Chang et al. |
| 2009/0121548 A1 | 5/2009 | Schindler et al. |
| 2009/0149221 A1 | 6/2009 | Liu et al. |
| 2009/0169163 A1 | 7/2009 | Abbott, III et al. |
| 2009/0175214 A1 | 7/2009 | Sfar et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0280854 A1 | 11/2009 | Khan et al. |
| 2009/0285147 A1 | 11/2009 | Subasic et al. |
| 2010/0002626 A1 | 1/2010 | Schmidt et al. |
| 2010/0027443 A1 | 2/2010 | LoGalbo et al. |
| 2010/0054746 A1 | 3/2010 | Logan |
| 2010/0056184 A1 | 3/2010 | Vakil et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0148373 A1 | 6/2010 | Chandrasekaran |
| 2010/0156721 A1 | 6/2010 | Alamouti et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0290355 A1 | 11/2010 | Roy et al. |
| 2010/0290787 A1 | 11/2010 | Cox |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0322206 A1 | 12/2010 | Hole et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0055861 A1 | 3/2011 | Covell et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0105110 A1 | 5/2011 | Carmon et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0172841 A1 | 7/2011 | Forbes, Jr. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0249715 A1 | 10/2011 | Choi et al. |
| 2011/0256878 A1 | 10/2011 | Zhu et al. |
| 2011/0260939 A1 | 10/2011 | Korva et al. |
| 2011/0266999 A1 | 11/2011 | Yodfat et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2012/0009926 A1 | 1/2012 | Hevizi et al. |
| 2012/0033676 A1 | 2/2012 | Mundra et al. |
| 2012/0063377 A1 | 3/2012 | Osterling et al. |
| 2012/0099448 A1 | 4/2012 | Matsuo et al. |
| 2012/0106442 A1 | 5/2012 | Xiao |
| 2012/0120995 A1 | 5/2012 | Wurth |
| 2012/0122405 A1 | 5/2012 | Gerber et al. |
| 2012/0163829 A1 | 6/2012 | Cox |
| 2012/0196611 A1 | 8/2012 | Venkatraman et al. |
| 2012/0214538 A1 | 8/2012 | Kim et al. |
| 2012/0289224 A1 | 11/2012 | Hallberg et al. |
| 2012/0293390 A1 | 11/2012 | Shoemaker et al. |
| 2012/0307876 A1 | 12/2012 | Trachewsky et al. |
| 2012/0317426 A1 | 12/2012 | Hunter, Jr. et al. |
| 2012/0319916 A1 | 12/2012 | Gears et al. |
| 2013/0017863 A1 | 1/2013 | Kummetz et al. |
| 2013/0035047 A1 | 2/2013 | Chen et al. |
| 2013/0040676 A1 | 2/2013 | Kang et al. |
| 2013/0049469 A1 | 2/2013 | Huff et al. |
| 2013/0094425 A1 | 4/2013 | Soriaga et al. |
| 2013/0102309 A1 | 4/2013 | Chande et al. |
| 2013/0132683 A1 | 5/2013 | Ajanovic et al. |
| 2013/0137411 A1 | 5/2013 | Marin |
| 2013/0188959 A1 | 7/2013 | Cune et al. |
| 2013/0225182 A1 | 8/2013 | Singh et al. |
| 2013/0225183 A1 | 8/2013 | Meshkati et al. |
| 2013/0235726 A1 | 9/2013 | Frederiksen et al. |
| 2013/0260706 A1 | 10/2013 | Singh |
| 2013/0295980 A1 | 11/2013 | Reuven et al. |

(56) References Cited

U.S. PATENT DOCUMENTS

| | | |
|---|---|---|
| 2013/0330086 A1 | 12/2013 | Berlin et al. |
| 2013/0337750 A1 | 12/2013 | Ko |
| 2014/0024402 A1 | 1/2014 | Singh |
| 2014/0037294 A1 | 2/2014 | Cox et al. |
| 2014/0050482 A1 | 2/2014 | Berlin et al. |
| 2014/0075217 A1 | 3/2014 | Wong et al. |
| 2014/0087742 A1 | 3/2014 | Brower et al. |
| 2014/0089688 A1 | 3/2014 | Man et al. |
| 2014/0097846 A1 | 4/2014 | Lemaire et al. |
| 2014/0146692 A1 | 5/2014 | Hazani et al. |
| 2014/0148214 A1 | 5/2014 | Sasson |
| 2014/0153919 A1 | 6/2014 | Casterline et al. |
| 2014/0169246 A1 | 6/2014 | Chui et al. |
| 2014/0233442 A1 | 8/2014 | Atias et al. |
| 2014/0293894 A1 | 10/2014 | Saban et al. |
| 2014/0308043 A1 | 10/2014 | Heidler et al. |
| 2014/0308044 A1 | 10/2014 | Heidler et al. |
| 2015/0098350 A1 | 4/2015 | Mini et al. |
| 2015/0249513 A1 | 9/2015 | Schwab et al. |
| 2015/0380928 A1 | 12/2015 | Saig et al. |

FOREIGN PATENT DOCUMENTS

| | | |
|---|---|---|
| CN | 101803246 A | 8/2010 |
| CN | 101876962 A | 11/2010 |
| EP | 0851618 A2 | 7/1998 |
| EP | 0924881 A2 | 6/1999 |
| EP | 1227605 A2 | 7/2002 |
| EP | 1347584 A2 | 9/2003 |
| EP | 1954019 A1 | 8/2008 |
| GB | 2275834 A | 9/1994 |
| JP | 58055770 A | 4/1983 |
| JP | 2002353813 A | 12/2002 |
| KR | 20040053467 A | 6/2004 |
| KR | 1031619 B1 | 4/2011 |
| WO | 9603823 A1 | 2/1996 |
| WO | 0072475 A1 | 11/2000 |
| WO | 0184760 A1 | 11/2001 |
| WO | 03024027 A1 | 3/2003 |
| WO | 2005117337 A1 | 12/2005 |
| WO | 2006077569 A1 | 7/2006 |
| WO | 2006077570 A1 | 7/2006 |
| WO | 2008083317 A1 | 7/2008 |
| WO | 2009014710 A1 | 1/2009 |
| WO | 2009145789 A1 | 12/2009 |
| WO | 2010090999 A1 | 8/2010 |
| WO | 2010132292 A1 | 11/2010 |
| WO | 2011123314 A1 | 10/2011 |
| WO | 2012051227 A1 | 4/2012 |
| WO | 2012051230 A1 | 4/2012 |
| WO | 2012064333 A1 | 5/2012 |
| WO | 2012103822 A2 | 8/2012 |
| WO | 2015049671 A2 | 4/2015 |

OTHER PUBLICATIONS

International Preliminary Report on Patentability for PCT/US2010/056458 mailed May 23, 2013, 9 pages.
Non-final Office Action for U.S. Appl. No. 13/410,916 mailed Jul. 18, 2012, 13 pages.
Notice of Allowance for U.S. Appl. No. 13/410,916 mailed Aug. 9, 2012, 9 pages.
Non-Final Office Action for U.S. Appl. No. 13/771,756 mailed Sep. 10, 2014, 26 pages.
Author Unknown, "MDA SDx Packaged Stations," Technical Manual, MDS 05-6312A01, Revision B, May 2011, GE MDS, LLC, Rochester, New York, 44 pages.
Author Unknown, "Quad Integrated IEEE 802,3at PSE Controller and Power Management System with up to 30W per Port Capabilities," Product Brief, BCM59103, Broadcom Corporation, Oct. 12, 2009, 2 pages.
Author Unknown, "Quad IEEE 802,3at Power Over Ethernet Controller," Product Brief, LTC4266, Linear Technology Corporation, 2009, 2 pages.
Author Unknown, "Single IEEE 802.3at Power Over Ethernet Controller," Product Brief, LTC4274, Linear Technology Corporation, 2009, 2 pages.
Author Unknown, "TPS23841: High-Power, Wide Voltage Range, Quad-Port Ethernet Power Sourcing Equipment Manager," Texas Instruments Incorporated, Nov. 2006, Revised May 2007, 48 pages.
International Search Report for PCT/US2010/034005 mailed Aug. 12, 2010, 4 pages.
International Preliminary Report on Patentability for PCT/US2010/034005 mailed Nov. 24, 2011, 7 pages.
International Search Report for PCT/US2011/055858 mailed Feb. 7, 2012, 4 pages.
International Preliminary Report on Patentability for PCT/US2011/055858 mailed Apr. 25, 2013, 8 pages.
International Search Report for PCT/US2011/055861 mailed Feb. 7, 2012, 4 pages.
International Preliminary Report on Patentability for PCT/US2011/055861 mailed Apr. 25, 2013, 9 pages.
International Search Report for PCT/US2011/061761 mailed Jan. 26, 2012, 3 pages.
International Preliminary Report on Patentability for PCT/US2011/061761 mailed Jun. 6, 2013, 9 pages.
Translation of the the First Office Action for Chinese Patent Application No. 201180059270.4 issued May 13, 2015, 19 pages.
International Search Report for PCT/US2013/058937 mailed Jan. 14, 2014, 4 pages.
International Preliminary Report on Patentability for PCT/US2013/058937 mailed Apr. 9, 2015, 7 pages.
International Search Report for PCT/IL2013/050976, mailed Mar. 18, 2014, 3 pages.
Non-final Office Action for U.S. Appl. No. 13/626,371 mailed Dec. 13, 2013, 15 pages.
Non-final Office Action for U.S. Appl. No. 13/626,371 mailed Jun. 25, 2014, 16 pages.
Notice of Allowance for U.S. Appl. No. 13/626,371 mailed Nov. 25, 2014, 7 pages.
Notice of Allowance for U.S. Appl. No. 13/626,371 mailed Aug. 3, 2015, 7 pages.
Non-final Office Action for U.S. Appl. No. 13/859,985 mailed Feb. 27, 2015, 15 pages.
Final Office Action for U.S. Appl. No. 13/859,985 mailed Jul. 22, 2015, 8 pages.
Non-final Office Action for U.S. Appl. No. 13/860,017 mailed Feb. 27, 2015, 15 pages.
Final Office Action for U.S. Appl. No. 13/860,017 mailed Jul. 23, 2015, 8 pages.
Non-Final Office Action for U.S. Appl. No. 13/950,397, mailed Mar. 17, 2015, 6 pages.
Notice of Allowance for U.S. Appl. No. 13/950,397, mailed Jun. 10, 2015, 7 pages.
Non-final Office Action for U.S. Appl. No. 13/687,457 mailed Jul. 30, 2015, 12 pages.
Final Office Action for U.S. Appl. No. 13/771,756 mailed Apr. 30, 2015, 38 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Author Unknown, "INT6400/INT1400: HomePlug AV Chip Set," Product Brief, Atheros Powerline Technology, 27003885 Revision 2, Atheros Communications, Inc., 2009, 2 pages.
Author Unknown, "MegaPlug AV: 200 Mbps Ethernet Adapter," Product Specifications, Actiontec Electronics, Inc., 2010, 2 pages.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.

(56) References Cited

OTHER PUBLICATIONS

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Windyka, John et al., "System-Level Integrated Circuit (SLIC) Technology Development for Phased Array Antenna Applications," Contractor Report 204132, National Aeronautics and Space Administration, Jul. 1997, 94 pages.
International Preliminary Report on Patentability for PCT/US2011/061761 mailed May 28, 2013, 8 pages.
Translation of the First Office Action for Chinese Patent Application No. 201180053270.3 issued May 26, 2015, 17 pages.
Translation of the First Office Action for Chinese Patent Application No. 201180052537.7 issued Jun. 25, 2015, 9 pages.
Advisory Action for U.S. Appl. No. 13/771,756, mailed Aug. 21, 2015, 4 pages.
International Search Report and Written Opinion for PCT/IL2015/050656, mailed Oct. 8, 2015, 9 pages.
The Second Office Action for Chinese Patent Application No. 201180059270.4, mailed Jan. 28, 2016, 42 pages.
Final Office Action for U.S. Appl. No. 13/687,457, mailed Feb. 12, 2016, 22 pages.
Notice of Allowance for U.S. Appl. No. 13/771,756, mailed Jan. 29, 2016, 14 pages.
Non-final Office Action for U.S. Appl. No. 14/317,475, mailed Feb. 3, 2016, 12 pages.
Non-final Office Action for U.S. Appl. No. 14/845,768, mailed Nov. 19, 2015, 12 pages.
Non-final Office Action for U.S. Appl. No. 14/845,946, mailed Dec. 17, 2015, 11 pages.
Author Unknown, "Equivalent Circuits—(Thevenin and Norton)," Bucknell Lecture Notes, Wayback Machine, Mar. 25, 2010, http://www.facstaff.bucknell.edu/mastascu/elessonsHTML/Source/Source2.html, 15 pages.
International Search Report and Written Opinion for PCT/IL2014/050766, mailed Nov. 11, 2014, 12 pages.
International Preliminary Report on Patentability for PCT/IL2014/050766, mailed Mar. 10, 2016, 9 pages.
Advisory Action and Applicant-Initiated Interview Summary for U.S. Appl. No. 13/687,457, mailed May 13, 2016, 5 pages.
Non-final Office Action for U.S. Appl. No. 13/687,457, mailed Jun. 27, 2016, 30 pages.
Final Office Action for U.S. Appl. No. 14/317,475, mailed May 26, 2016, 12 pages.
Notice of Allowance for U.S. Appl. No. 14/317,475, mailed Aug. 5, 2016, 7 pages.
Notice of Allowance for U.S. Appl. No. 14/845,768, mailed Apr. 11, 2016, 8 pages.
Notice of Allowance for U.S. Appl. No. 14/845,946, mailed Jun. 8, 2016, 7 pages.
International Search Report and Written Opinion for PCT/IL2014/051012, mailed Mar. 5, 2015, 11 pages.
The Third Office Action for Chinese Patent Application No. 201180059270.4, issued Aug. 23, 2016, 6 pages.
Non-Final Office Action for U.S. Appl. No. 14/845,946, mailed Sep. 9, 2016, 10 pages.
Non-Final Office Action for U.S. Appl. No. 14/884,317, mailed Aug. 31, 2016, 16 pages.
Non-Final Office Action for U.S. Appl. No. 14/845,929, mailed Nov. 7, 2016, 5 pages.
Non-Final Office Action for U.S. Appl. No. 14/853,118, mailed Aug. 12, 2016, 7 pages.
Non-Final Office Action for U.S. Appl. No. 14/961,098, mailed Nov. 14, 2016, 10 pages.
Final Office Action for U.S. Appl. No. 13/687,457, mailed Feb. 10, 2017, 33 pages.
Non-Final Office Action for U.S. Appl. No. 14/884,317, mailed Feb. 13, 2017, 17 pages.
Translation of the Fourth Office Action for Chinese Patent Application No. 201180059270.4, mailed Jan. 20, 2017, 6 pages.

\* cited by examiner

POWER DISTRIBUTION MODULE(S) CAPABLE OF HOT CONNECTION AND/OR DISCONNECTION FOR DISTRIBUTED ANTENNA SYSTEMS, AND RELATED POWER UNITS, COMPONENTS, AND METHODS

PRIORITY APPLICATION

This application is a continuation of International Application No. PCT/US11/61761 filed Nov. 22, 2011, which claims the benefit of priority to U.S. Provisional Patent Application Ser. No. 61/416,780 filed on Nov. 24, 2010, both applications being incorporated herein by reference.

RELATED APPLICATION

This application is related to U.S. patent application Ser. No. 12/466,514 filed on filed May 15, 2009 and entitled "Power Distribution Devices, Systems, and Methods For Radio-Over-Fiber (RoF) Distributed Communication," now issued as U.S. Pat. No. 8,155,525, which is incorporated herein by reference in its entirety.

BACKGROUND

Field of the Disclosure

The technology of the disclosure relates to power units for providing power to remote antenna units in a distributed antenna system.

Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communications or antenna systems communicate with wireless devices called "clients," which must reside within the wireless range or "cell coverage area" in order to communicate with an access point device.

One approach to deploying a distributed antenna system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed antenna system access to clients within the building or facility. However, it may be desirable to employ optical fiber to distribute communication signals. Benefits of optical fiber include increased bandwidth.

One type of distributed antenna system for creating antenna coverage areas includes distribution of RF communications signals over an electrical conductor medium, such as coaxial cable or twisted pair wiring. Another type of distributed antenna system for creating antenna coverage areas, called "Radio-over-Fiber" or "RoF," utilizes RF communications signals sent over optical fibers. Both types of systems can include head-end equipment coupled to a plurality of remote antenna units (RAUs) that each provides antenna coverage areas. The RAUs can each include RF transceivers coupled to an antenna to transmit RF communications signals wirelessly, wherein the RAUs are coupled to the head-end equipment via the communication medium. The RF transceivers in the remote antenna units are transparent to the RF communications signals. The antennas in the RAUs also receive RF signals (i.e., electromagnetic radiation) from clients in the antenna coverage area. The RF signals are then sent over the communication medium to the head-end equipment. In optical fiber or RoF distributed antenna systems, the RAUs convert incoming optical RF signals from an optical fiber downlink to electrical RF signals via optical-to-electrical (O/E) converters, which are then passed to the RF transceiver. The RAUs also convert received electrical RF communications signals from clients via the antennas to optical RF communications signals via electrical-to-optical (E/O) converters. The optical RF signals are then sent over an optical fiber uplink to the head-end equipment.

The RAUs contain power-consuming components, such as the RF transceiver, to transmit and receive RF communications signals and thus require power to operate. In the situation of an optical fiber-based distributed antenna system, the RAUs may contain O/E and E/O converters that also require power to operate. As an example, the RAU may contain a housing that includes a power supply to provide power to the RAUs locally at the RAU. The power supply may be configured to be connected to a power source, such as an alternating current (AC) power source, and convert AC power into a direct current (DC) power signal. Alternatively, power may be provided to the RAUs from remote power supplies. The remote power suppliers may be configured to provide power to multiple RAUs. It may be desirable to provide these power supplies in modular units or devices that may be easily inserted or removed from a housing to provide power. Providing modular power distribution modules allows power to more easily be configured as needed for the distributed antenna system. For example, a remotely located power unit may be provided that contains a plurality of ports or slots to allow a plurality of power distribution modules to be inserted therein. The power unit may have ports that allow the power to be provided over an electrical conductor medium to the RAUs. Thus, when a power distribution module is inserted in the power unit in a port or slot that corresponds to a given RAU, power from the power distribution module is supplied to the RAU.

It may be desired to allow these power distribution modules to be inserted and removed from the power unit without deactivating other power distribution modules providing power to other RAUs. If power to the power unit were required to be deactivated, RF communications for all RAUs that receiver power from the power unit may be disabled, even if the power distribution module inserted and/or removed from the power unit is configured to supply power to only a subset of the RAUs receiving power from the power unit. However, inserting and removing power distribution modules in a power unit while power is active and being provided in the power unit may cause electrical arcing and electrical contact erosion that can damage the power distribution module or power-consuming components connected to the power distribution module.

SUMMARY OF THE DETAILED DESCRIPTION

Embodiments disclosed in the detailed description include power distribution modules capable of "hot" connection and/or disconnection in distributed antenna systems (DASs). Related power units, components, and methods are also disclosed. By "hot" connection and/or disconnection, it is meant that the power distribution modules can be connected and/or disconnected from a power unit and/or power-consuming components while power is being provided to the power distribution modules. In this regard, it is not required to disable providing power to the power distribution module before connection and/or disconnection of power distribution modules to a power unit and/or power-consuming components. As a non-limiting example, the power distribution modules may be configured to protect against or reduce electrical arcing or electrical contact erosion that may otherwise result from "hot" connection and/or disconnection.

In embodiments disclosed herein, the power distribution modules can be installed in and connected to a power unit for providing power to a power-consuming DAS component(s), such as a remote antenna unit(s) (RAU(s)) as a non-limiting example. Main power is provided to the power unit and distributed to power distribution modules installed and connected in the power unit. Power from the main power provided by the power unit is distributed by each of the power distribution modules to any power-consuming DAS components connected to the power distribution modules. The power distribution modules distribute power to the power-consuming DAS components to provide power for power-consuming components in the power-consuming DAS components.

In this regard in one embodiment, a power distribution module for distributing power in a distributed antenna system is provided. The power distribution module comprises an input power port configured to receive input power from an external power source. The power distribution module also comprises at least one output power port configured to receive output power and distribute the output power to at least one distributed antenna system (DAS) power-consuming device electrically coupled to the at least one output power port. The power distribution module also comprises at least one power controller configured to selectively distribute output power as the input power to the at least one output power port based on a power enable signal coupled to the enable input port. Other embodiments are also disclosed herein.

The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Figure 1:
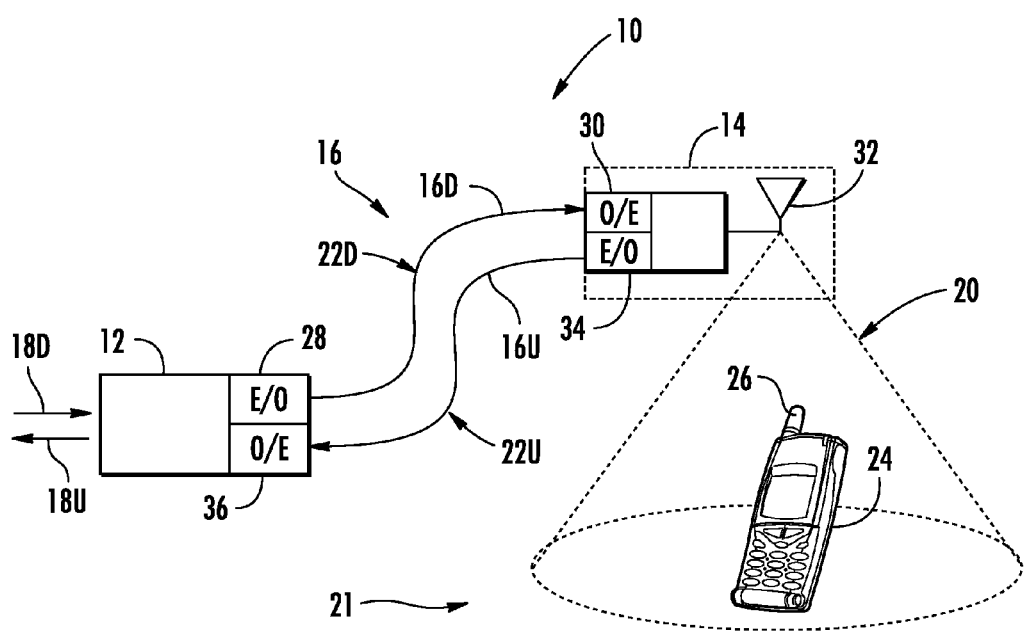
FIG. 1 is a schematic diagram of an exemplary distributed antenna system.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include power distribution modules capable of "hot" connection and/or disconnection in distributed antenna systems (DASs). Related components, power units, and methods are also disclosed. By "hot" connection and/or disconnection, it is meant that the power distribution modules can be connected and/or disconnected from a power unit and/or power-consuming components while power is being provided to the power distribution modules. In this regard, it is not required to disable providing power to the power distribution module before connection and/or disconnection of power distribution modules to a power unit and/or power-consuming components. As a non-limiting example, the power distribution modules may be configured to protect against or reduce electrical arcing or electrical contact erosion that may otherwise result from "hot" connection and/or disconnection.

In embodiments disclosed herein, the power distribution modules can be installed in and connected to a power unit for providing power to a power-consuming DAS component(s), such as a remote antenna unit(s) (RAU(s)) as a non-limiting example. Main power is provided to the power unit and distributed to power distribution modules installed and connected in the power unit. Power from the main power provided by the power unit is distributed by each of the power distribution modules to any power-consuming DAS components connected to the power distribution modules. The power distribution modules distribute power to the power-consuming DAS components to provide power for power-consuming components in the power-consuming DAS components.

Before discussing examples of power distribution modules capable of "hot" connection and/or disconnection in distributed antenna systems (DASs), exemplary distributed antenna systems capable of distributing RF communications signals to distributed or remote antenna units (RAUs) are first described with regard to FIGS. 1-6. The distributed antenna systems in FIGS. 1-6 can include power units located remotely from RAUs that provide power to the RAUs for operation. Embodiments of power distribution modules capable of "hot" connection and/or disconnection in distributed antenna systems, including the distributed antenna systems in FIGS. 1-6, begin with FIG. 7. The distributed antenna systems in FIGS. 1-6 discussed below include distribution of radio frequency (RF) communications signals; however, the distributed antenna systems are not limited to distribution of RF communications signals. Also note that while the distributed antenna systems in FIGS. 1-6 discussed below include distribution of communications signals over optical fiber, these distributed antenna systems are not limited to distribution over optical fiber. Distribution mediums could also include, but are not limited to, coaxial cable, twisted-pair conductors, wireless transmission and reception, and any combination thereof. Also, any combination can be employed that also involves optical fiber for portions of the distributed antenna system.

In this regard, FIG. 1 is a schematic diagram of an embodiment of a distributed antenna system. In this embodiment, the system is an optical fiber-based distributed antenna system 10. The distributed antenna system 10 is configured to create one or more antenna coverage areas for establishing communications with wireless client devices located in the RF range of the antenna coverage areas. The distributed antenna system 10 provides RF communication services (e.g., cellular services). In this embodiment, the distributed antenna system 10 includes head-end equipment (HEE) 12 such as a head-end unit (HEU), one or more remote antenna units (RAUs) 14, and an optical fiber 16 that optically couples the HEE 12 to the RAU 14. The RAU 14 is a type of remote communications unit. In general, a remote communications unit can support either wireless communications, wired communications, or both. The RAU 14 can support wireless communications and may also support wired communications. The HEE 12 is configured to receive communications over downlink electrical RF signals 18D from a source or sources, such as a network or carrier as examples, and provide such communications to the RAU 14. The HEE 12 is also configured to return communications received from the RAU 14, via uplink electrical RF signals 18U, back to the source or sources. In this regard in this embodiment, the optical fiber 16 includes at least one downlink optical fiber 16D to carry signals communicated from the HEE 12 to the RAU 14 and at least one uplink optical fiber 16U to carry signals communicated from the RAU 14 back to the HEE 12.

One downlink optical fiber 16D and one uplink optical fiber 16U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," published as U.S. Patent Application Publication No. 2011/0268446, incorporated herein by reference in its entirety. Other options for WDM and frequency-division multiplexing (FDM) are disclosed in U.S. patent application Ser. No. 12/892,424, any of which can be employed in any of the embodiments disclosed herein. Further, U.S. patent application Ser. No. 12/892,424, published as U.S. Patent Application Publication No. 2011/0268446, also discloses distributed digital data communications signals in a distributed antenna system which may also be distributed in the optical fiber-based distributed antenna system 10 either in conjunction with RF communications signals or not.

The optical fiber-based distributed antenna system 10 has an antenna coverage area 20 that can be disposed about the RAU 14. The antenna coverage area 20 of the RAU 14 forms an RF coverage area 21. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the HEE 12 includes a radio interface in the form of an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the HEE 12 converts the uplink optical RF signals 22U into uplink electrical RF signals, which can then be communicated as uplink electrical RF signals 18U back to a network or other source. The HEE 12 in this embodiment is not able to distinguish the location of the client devices 24 in this embodiment. The client device 24 could be in the range of any antenna coverage area 20 formed by an RAU 14.

Figure 2:
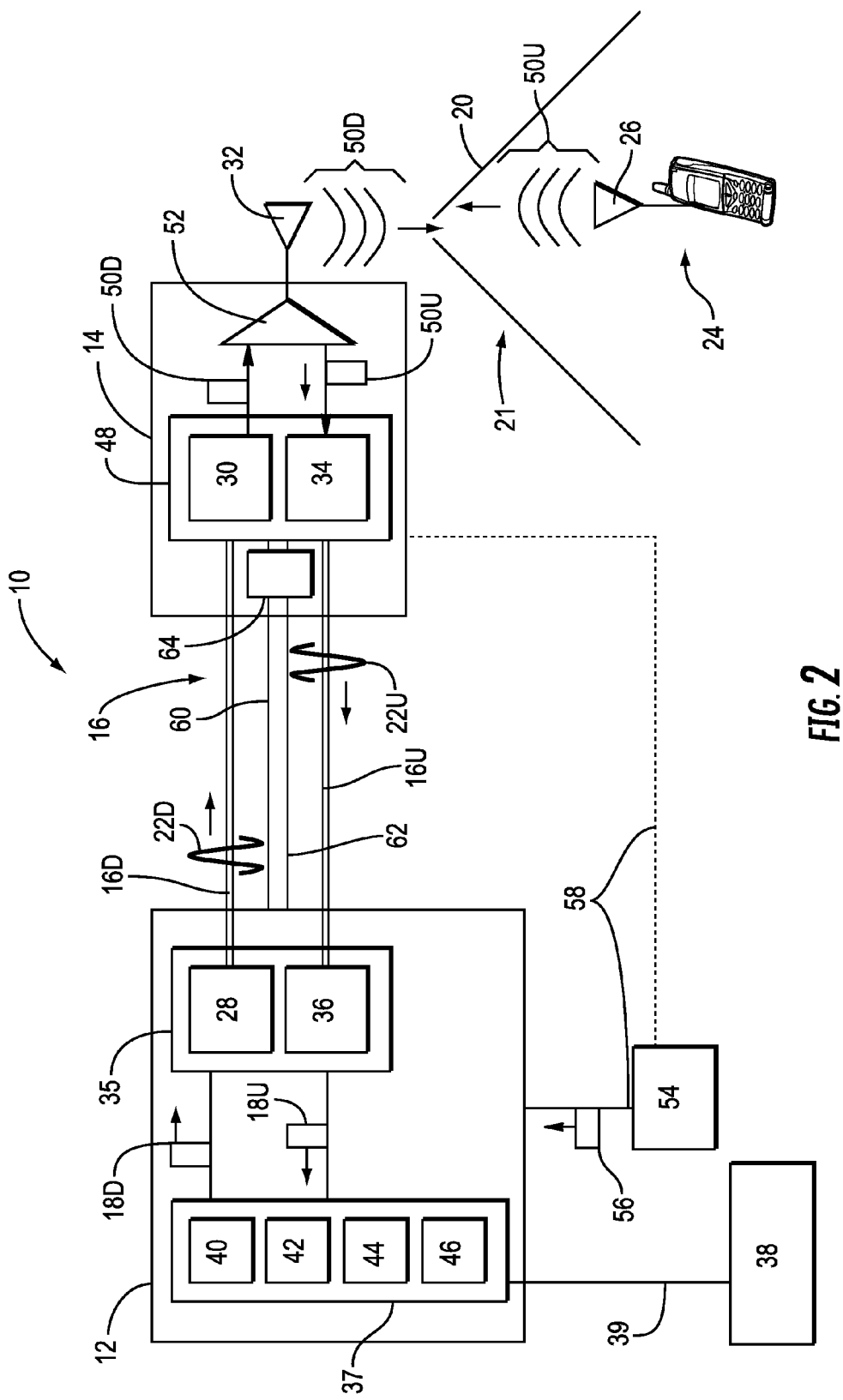
FIG. 2 is a more detailed schematic diagram of exemplary head-end equipment and a remote antenna unit (RAU) that can be deployed in the distributed antenna system of FIG. 1.

FIG. 2 is a more detailed schematic diagram of the exemplary distributed antenna system 10 of FIG. 1 that provides electrical RF service signals for a particular RF service or application. In an exemplary embodiment, the HEE 12 includes a service unit 37 that provides electrical RF service signals by passing (or conditioning and then passing) such signals from one or more outside networks 38 via a network link 39. In a particular example embodiment, this includes providing cellular signal distribution in the frequency range from 400 MegaHertz (MHz) to 2.7 GigaHertz (GHz). Any other electrical RF signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E/O converter 28 that receives the downlink electrical RF signals 18D from the service unit 37 and converts them to corresponding downlink optical RF signals 22D. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEE 12 also includes the O/E converter 36, which is electrically coupled to the service unit 37. The O/E converter 36 receives the uplink optical RF signals 22U and converts them to corresponding uplink electrical RF signals 18U. In an example embodiment, the O/E converter 36 is a photodetector, or a photodetector electrically coupled to a linear amplifier. The E/O converter 28 and the O/E converter 36 constitute a "converter pair" 35, as illustrated in FIG. 2.

In accordance with an exemplary embodiment, the service unit 37 in the HEE 12 can include an RF signal conditioner unit 40 for conditioning the downlink electrical RF signals 18D and the uplink electrical RF signals 18U, respectively. The service unit 37 can include a digital signal processing unit ("digital signal processor") 42 for providing to the RF signal conditioner unit 40 an electrical signal that is modulated onto an RF carrier to generate a desired downlink electrical RF signal 18D. The digital signal processor 42 is also configured to process a demodulation signal provided by the demodulation of the uplink electrical RF signal 18U by the RF signal conditioner unit 40. The HEE 12 can also include an optional central processing unit (CPU) 44 for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the O/E converter 30 and the E/O converter 34. The O/E converter 30 converts the received downlink optical RF signals 22D from the HEE 12 back into downlink electrical RF signals 50D. The E/O converter 34 converts uplink electrical RF signals 50U received from the client device 24 into the uplink optical RF signals 22U to be communicated to the HEE 12. The O/E converter 30 and the E/O converter 34 are electrically coupled to the antenna 32 via an RF signal-directing element 52, such as a circulator for example. The RF signal-directing element 52 serves to direct the downlink electrical RF signals 50D and the uplink electrical RF signals 50U, as discussed below. In accordance with an exemplary embodiment, the antenna 32 can include any type of antenna, including but not limited to one or more patch antennas, such as disclosed in U.S. patent application Ser. No. 11/504,999, filed Aug. 16, 2006 entitled "Radio-over-Fiber Transponder With A Dual-Band Patch Antenna System," issued as U.S. Pat. No. 7,627,250, and U.S. patent application Ser. No. 11/451,553, filed Jun. 12, 2006 entitled "Centralized Optical Fiber-Based Wireless Picocellular Systems and Methods," published as U.S. Patent Application Publication No. 2007/0286599, both of which are incorporated herein by reference in their entireties.

With continuing reference to FIG. 2, the optical fiber-based distributed antenna system 10 also includes a power unit 54 that includes a power supply and provides an electrical power signal 56. The power unit 54 is electrically coupled to the HEE 12 for powering the power-consuming elements therein. In an exemplary embodiment, an electrical power line 58 runs through the HEE 12 and over to the RAU 14 to power the O/E converter 30 and the E/O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a voltage, and are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power unit 54 to the RAU 14 rather than from or through the HEE 12. In another example embodiment, the electrical power line 58 includes more than two wires and may carry multiple voltages.

Figure 3A:
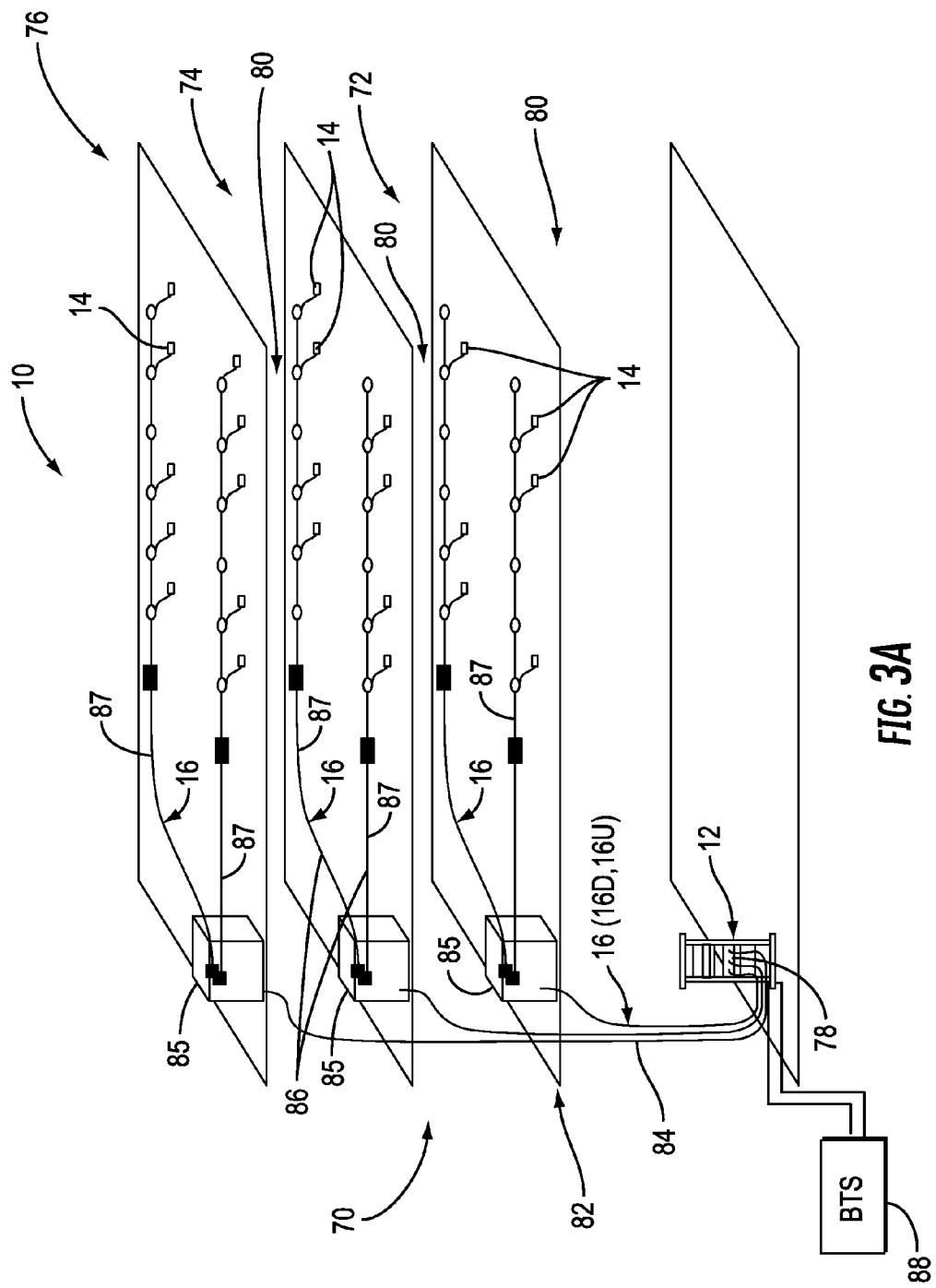
FIG. 3A is a partially schematic cut-away diagram of an exemplary building infrastructure in which the distributed antenna system in FIG. 1 can be employed.

To provide further exemplary illustration of how a distributed antenna system can be deployed indoors, FIG. 3A is provided. FIG. 3A is a partially schematic cut-away diagram of a building infrastructure 70 employing an optical fiber-based distributed antenna system. The system may be the optical fiber-based distributed antenna system 10 of FIGS. 1 and 2. The building infrastructure 70 generally represents any type of building in which the optical fiber-based distributed antenna system 10 can be deployed. As previously discussed with regard to FIGS. 1 and 2, the optical fiber-based distributed antenna system 10 incorporates the HEE 12 to provide various types of communication services to coverage areas within the building infrastructure 70, as an example.

For example, as discussed in more detail below, the distributed antenna system 10 in this embodiment is configured to receive wireless RF signals and convert the RF signals into RoF signals to be communicated over the optical fiber 16 to multiple RAUs 14. The optical fiber-based distributed antenna system 10 in this embodiment can be, for example, an indoor distributed antenna system (IDAS) to provide wireless service inside the building infrastructure 70. These wireless signals can include cellular service, wireless services such as RFID tracking, Wireless Fidelity (WiFi), local area network (LAN), WLAN, public safety, wireless building automations, and combinations thereof, as examples.

Figure 3B:
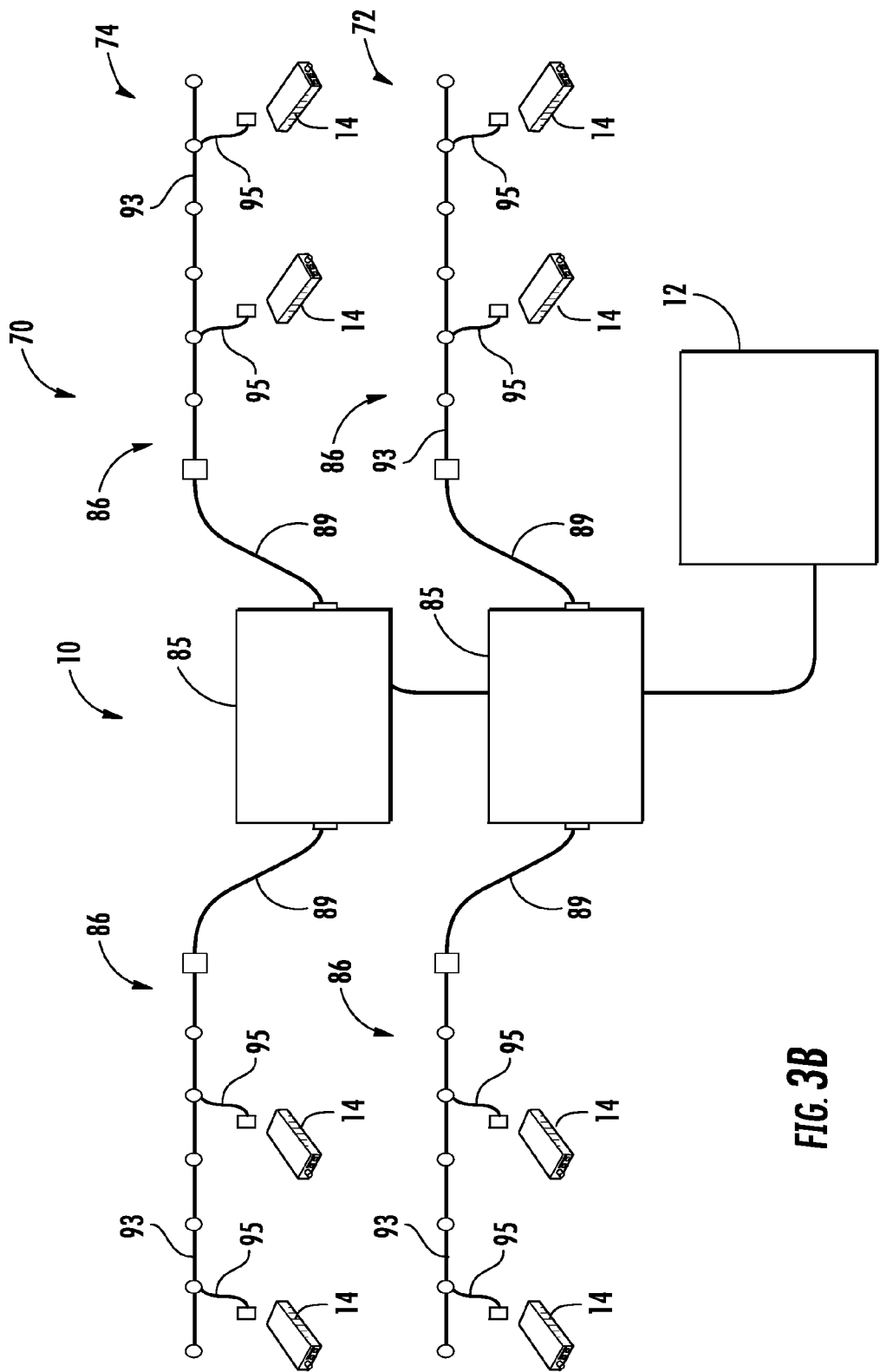
FIG. 3B is an alternative diagram of the distributed antenna system in FIG. 3A.

With continuing reference to FIG. 3A, the building infrastructure 70 in this embodiment includes a first (ground) floor 72, a second floor 74, and a third floor 76. The floors 72, 74, 76 are serviced by the HEE 12 through a main distribution frame 78 to provide antenna coverage areas 80 in the building infrastructure 70. Only the ceilings of the floors 72, 74, 76 are shown in FIG. 3A for simplicity of illustration. In the example embodiment, a main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEE 12. The riser cable 84 may be routed through a power unit 85. The power unit 85 may be provided as part of or separate from the power unit 54 in FIG. 2. The power unit 85 may also be configured to provide power to the RAUs 14 via the electrical power line 58, as illustrated in FIG. 2 and discussed above, provided inside an array cable 87, or tail cable or home-run tether cable as other examples, and distributed with the downlink and uplink optical fibers 16D, 16U to the RAUs 14. For example, as illustrated in the building infrastructure 70 in FIG. 3B, a tail cable 89 may extend from the power units 85 into an array cable 93. Downlink and uplink optical fibers in tether cables 95 of the array cables 93 are routed to each of the RAUs 14, as illustrated in FIG. 3B. The main cable 82 can include one or more multi-cable (MC) connectors adapted to connect select downlink and uplink optical fibers 16D, 16U, along with an electrical power line, to a number of optical fiber cables 86.

The main cable 82 enables multiple optical fiber cables 86 to be distributed throughout the building infrastructure 70 (e.g., fixed to the ceilings or other support surfaces of each floor 72, 74, 76) to provide the antenna coverage areas 80 for the first, second, and third floors 72, 74, and 76. In an example embodiment, the HEE 12 is located within the building infrastructure 70 (e.g., in a closet or control room), while in another example embodiment, the HEE 12 may be located outside of the building infrastructure 70 at a remote location. A base transceiver station (BTS) 88, which may be provided by a second party such as a cellular service provider, is connected to the HEE 12, and can be co-located or located remotely from the HEE 12. A BTS is any station or signal source that provides an input signal to the HEE 12 and can receive a return signal from the HEE 12.

In a typical cellular system, for example, a plurality of BTSs are deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell or femtocell as other examples.

The optical fiber-based distributed antenna system 10 in FIGS. 1-3B and described above provides point-to-point communications between the HEE 12 and the RAU 14. A multi-point architecture is also possible as well. With regard to FIGS. 1-3B, each RAU 14 communicates with the HEE 12 over a distinct downlink and uplink optical fiber pair to provide the point-to-point communications. Whenever an RAU 14 is installed in the optical fiber-based distributed antenna system 10, the RAU 14 is connected to a distinct downlink and uplink optical fiber pair connected to the HEE 12. The downlink and uplink optical fibers 16D, 16U may be provided in a fiber optic cable. Multiple downlink and uplink optical fiber pairs can be provided in a fiber optic cable to service multiple RAUs 14 from a common fiber optic cable.

For example, with reference to FIG. 3A, RAUs 14 installed on a given floor 72, 74, or 76 may be serviced from the same optical fiber 16. In this regard, the optical fiber 16 may have multiple nodes where distinct downlink and uplink optical fiber pairs can be connected to a given RAU 14. One downlink optical fiber 16D could be provided to support multiple channels each using wavelength-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

The HEE 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

Figure 4:
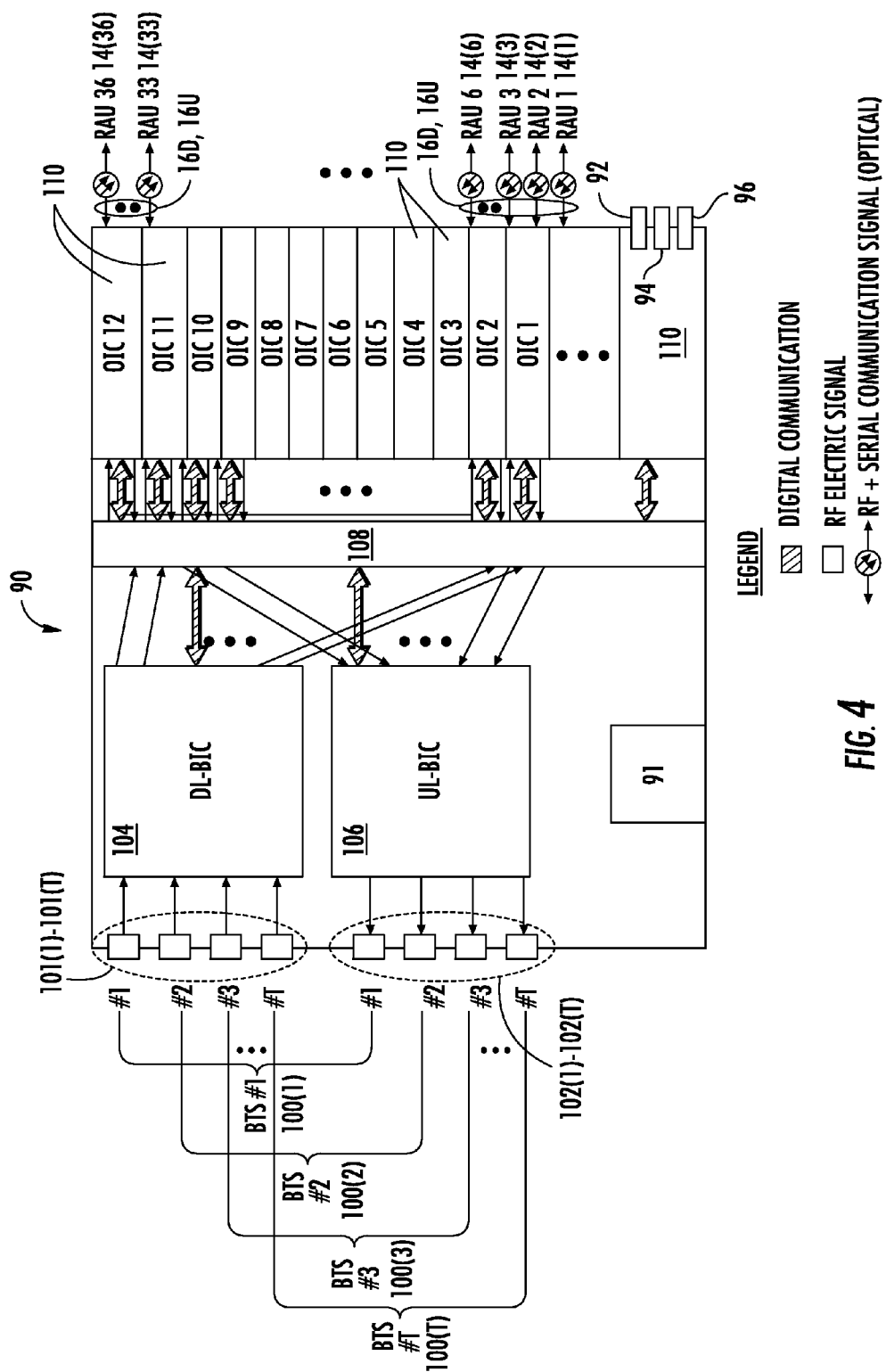
FIG. 4 is a schematic diagram of exemplary head-end equipment (HEE) to provide radio frequency (RF) communication services to RAUs or other remote communications devices in a distributed antenna system.

FIG. 4 is a schematic diagram of exemplary HEE 90 that may be employed with any of the distributed antenna systems disclosed herein, including but not limited to the distributed antenna system 10 in FIGS. 1-3. The HEE 90 in this embodiment is configured to distribute RF communication services over optical fiber. In this embodiment as illustrated in FIG. 4, the HEE 90 includes a head-end controller (HEC) 91 that manages the functions of the HEE 90 components and communicates with external devices via interfaces, such as an RS-232 port 92, a Universal Serial Bus (USB) port 94, and an Ethernet port 96, as examples. The HEE 90 can be connected to a plurality of BTSs, transceivers 100(1)-100(T), and the like via BTS inputs 101(1)-101(T) and BTS outputs 102(1)-102(T). The notation "1-T" indicates that any number of BTS transceivers can be provided up to T number with corresponding BTS inputs and BTS outputs.

With continuing reference to FIG. 4, the BTS inputs 101(1)-101(T) are downlink connections and the BTS outputs 102(1)-102(T) are uplink connections. Each BTS input 101(1)-101(T) is connected to a downlink radio interface in the form of a downlink BTS interface card (BIC) 104 in this embodiment, which is located in the HEE 90, and each BTS output 102(1)-102(T) is connected to a radio interface in the form of an uplink BIC 106 also located in the HEE 90. The downlink BIC 104 is configured to receive incoming or downlink RF signals from the BTS inputs 101(1)-101(T) and split the downlink RF signals into copies to be communicated to the RAUs 14, as illustrated in FIG. 2. In this embodiment, thirty-six (36) RAUs 14(1)-14(36) are supported by the HEE 90, but any number of RAUs 14 may be supported by the HEE 90. The uplink BIC 106 is configured to receive the combined outgoing or uplink RF signals from the RAUs 14 and split the uplink RF signals into individual BTS outputs 102(1)-102(T) as a return communication path.

With continuing reference to FIG. 4, the downlink BIC 104 is connected to a midplane interface card 108 in this embodiment. The uplink BIC 106 is also connected to the midplane interface card 108. The downlink BIC 104 and uplink BIC 106 can be provided in printed circuit boards (PCBs) that include connectors that can plug directly into the midplane interface card 108. The midplane interface card 108 is in electrical communication with a plurality of optical interfaces provided in the form of optical interface cards (OICs) 110 in this embodiment, which provide an optical to electrical communication interface and vice versa between the RAUs 14 via the downlink and uplink optical fibers 16D, 16U and the downlink BIC 104 and uplink BIC 106. The OICs 110 include the E/O converter 28 like discussed with regard to FIG. 1 that converts electrical RF signals from the downlink BIC 104 to optical RF signals, which are then communicated over the downlink optical fibers 16D to the RAUs 14 and then to client devices. The OICs 110 also include the O/E converter 36 like in FIG. 1 that converts optical RF signals communicated from the RAUs 14 over the uplink optical fibers 16U to the HEE 90 and then to the BTS outputs 102(1)-102(T).

With continuing reference to FIG. 4, the OICs 110 in this embodiment support up to three (3) RAUs 14 each. The OICs 110 can also be provided in a PCB that includes a connector that can plug directly into the midplane interface card 108 to couple the links in the OICs 110 to the midplane interface card 108. The OICs 110 may consist of one or multiple optical interface modules (OIMs). In this manner, the HEE 90 is scalable to support up to thirty-six (36) RAUs 14 in this embodiment since the HEE 90 can support up to twelve (12) OICs 110. If less than thirty-six (36) RAUs 14 are to be supported by the HEE 90, less than twelve (12) OICs 110 can be included in the HEE 90 and plugged into the midplane interface card 108. One OIC 110 is provided for every three (3) RAUs 14 supported by the HEE 90 in this embodiment. OICs 110 can also be added to the HEE 90 and connected to the midplane interface card 108 if additional RAUs 14 are desired to be supported beyond an initial configuration. With continuing reference to FIG. 4, the HEU 91 can also be provided that is configured to be able to communicate with the downlink BIC 104, the uplink BIC 106, and the OICs 110 to provide various functions, including configurations of amplifiers and attenuators provided therein.

Figure 5:
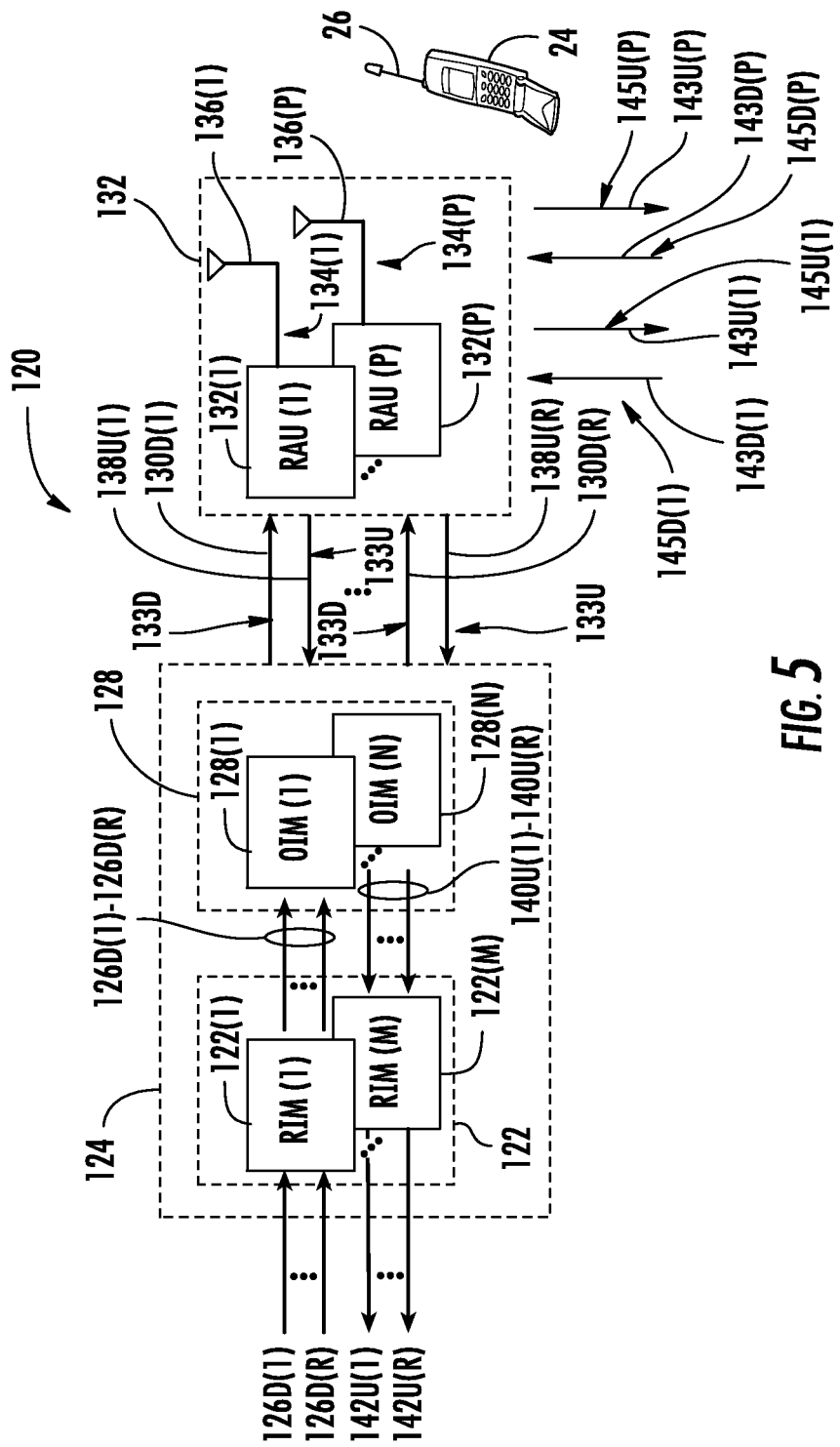
FIG. 5 is a schematic diagram of an exemplary distributed antenna system with alternative equipment to provide RF communication services and digital data services to RAUs or other remote communications devices in a distributed antenna system.

FIG. 5 is a schematic diagram of another exemplary optical fiber-based distributed antenna system 120 that may be employed according to the embodiments disclosed herein to provide RF communication services. In this embodiment, the optical fiber-based distributed antenna system 120 includes optical fiber for distributing RF communication services. The optical fiber-based distributed antenna system 120 in this embodiment is comprised of three (3) main components. One or more radio interfaces provided in the form of radio interface modules (RIMs) 122(1)-122(M) in this embodiment are provided in HEE 124 to receive and process downlink electrical RF communications signals 126D(1)-126D(R) prior to optical conversion into downlink optical RF communications signals. The RIMs 122(1)-122(M) provide both downlink and uplink interfaces. The processing of the downlink electrical RF communications signals 126D(1)-126D(R) can include any of the processing previously described above in the HEE 12 in FIGS. 1-4. The notations "1-R" and "1-M" indicate that any number of the referenced component, 1-R and 1-M, respectively, may be provided. As will be described in more detail below, the HEE 124 is configured to accept a plurality of RIMs 122(1)-122(M) as modular components that can easily be installed and removed or replaced in the HEE 124. In one embodiment, the HEE 124 is configured to support up to eight (8) RIMs 122(1)-122(M).

Each RIM 122(1)-122(M) can be designed to support a particular type of radio source or range of radio sources (i.e., frequencies) to provide flexibility in configuring the HEE 124 and the optical fiber-based distributed antenna system 120 to support the desired radio sources. For example, one RIM 122 may be configured to support the Personal Communication Services (PCS) radio band. Another RIM 122 may be configured to support the 700 MHz radio band. In this example, by inclusion of these RIMs 122, the HEE 124 would be configured to support and distribute RF communications signals on both PCS and LTE 700 radio bands. RIMs 122 may be provided in the HEE 124 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 122 may be provided in the HEE 124 that support any wireless technologies desired, including but not limited to Code Division Multiple Access (CDMA), CDMA200, 1xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD). RIMs 122 may be provided in the HEE 124 that support any frequencies desired referenced above as non-limiting examples.

The downlink electrical RF communications signals 126D(1)-126D(R) are provided to a plurality of optical interfaces provided in the form of optical interface modules (OIMs) 128(1)-128(N) in this embodiment to convert the downlink electrical RF communications signals 126D(1)-126D(N) into downlink optical RF communications signals 130D(1)-130D(R). The notation "1-N" indicates that any number of the referenced component 1-N may be provided. The OIMs 128 may be configured to provide one or more optical interface components (OICs) that contain O/E and E/O converters, as will be described in more detail below. The OIMs 128 support the radio bands that can be provided by the RIMs 122, including the examples previously described above. Thus, in this embodiment, the OIMs 128 may support a radio band range from 400 MHz to 2700 MHz, as an example, so providing different types or models of OIMs 128 for narrower radio bands to support possibilities for different radio band-supported RIMs 122 provided in the HEE 124 is not required. Further, as an example, the OIMs 128 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 128(1)-128(N) each include E/O converters to convert the downlink electrical RF communications signals 126D(1)-126D(R) to downlink optical RF communications signals 130D(1)-130D(R). The downlink optical RF communications signals 130D(1)-130D(R) are communicated over downlink optical fiber(s) 133D to a plurality of RAUs 132(1)-132(P). The notation "1-P" indicates that any number of the referenced component 1-P may be provided. O/E converters provided in the RAUs 132(1)-132(P) convert the downlink optical RF communications signals 130D(1)-130D(R) back into downlink electrical RF communications signals 126D(1)-126D(R), which are provided over downlinks 134(1)-134(P) coupled to antennas 136(1)-136(P) in the RAUs 132(1)-132(P) to client devices in the reception range of the antennas 136(1)-136(P).

Figure 6:
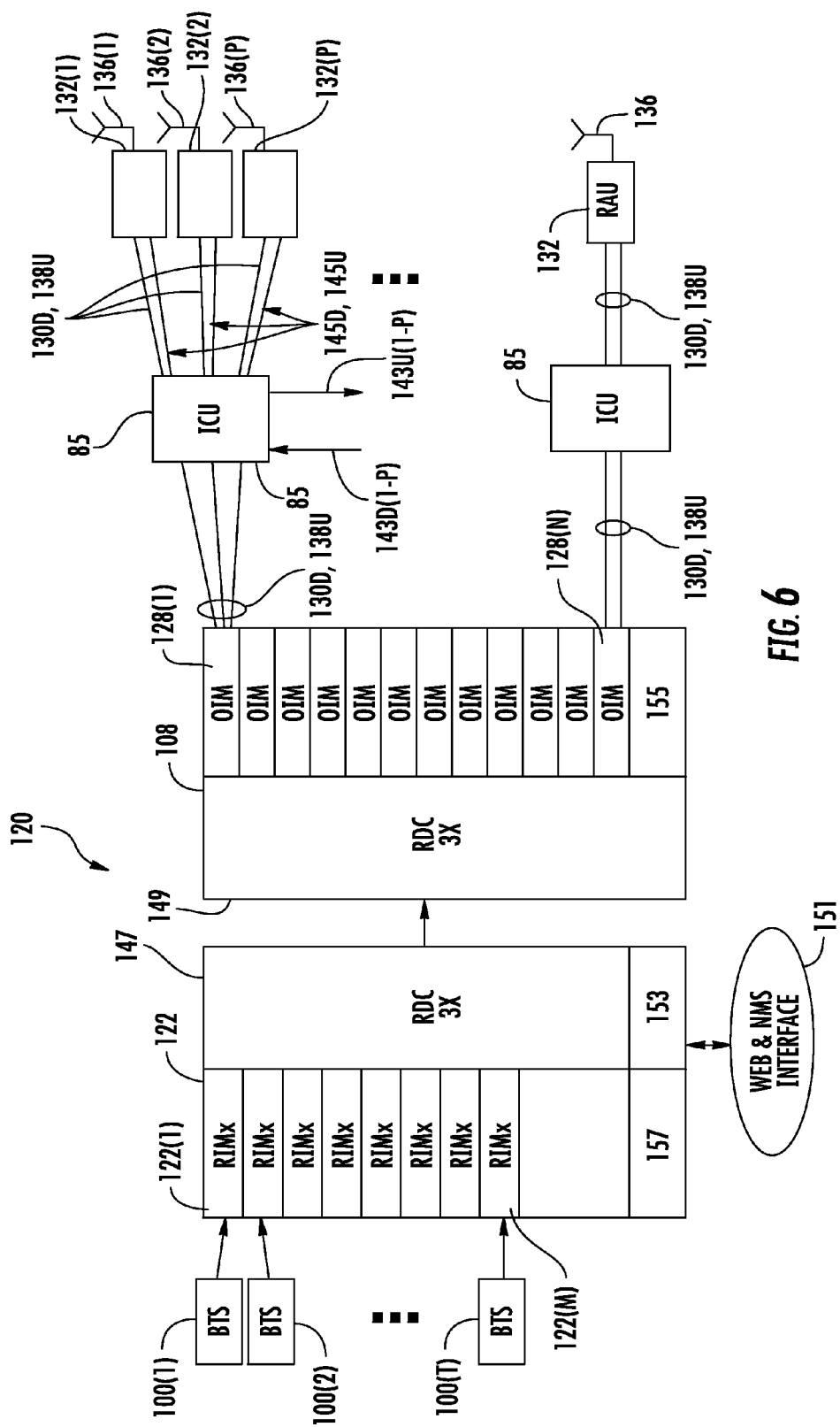
FIG. 6 is a schematic diagram of providing digital data services and RF communication services to RAUs or other remote communications devices in the distributed antenna system of FIG. 5.

E/O converters are also provided in the RAUs 132(1)-132(P) to convert uplink electrical RF communications signals 126U(1)-126U(R) received from client devices through the antennas 136(1)-136(P) into uplink optical RF communications signals 138U(1)-138U(R) to be communicated over uplink optical fibers 133U to the OIMs 128(1)-128(N). The OIMs 128(1)-128(N) include O/E converters that convert the uplink optical RF communications signals 138U(1)-138U(R) into uplink electrical RF communications signals 140U(1)-140U(R) that are processed by the RIMs 122(1)-122(M) and provided as uplink electrical RF communications signals 142U(1)-142U(R). Downlink electrical digital signals 143D(1)-143D(P) communicated over downlink electrical medium or media (hereinafter "medium") 145D(1)-145D(P) are provided to the RAUs 132(1)-132(P), separately from the RF communication services, as well as uplink electrical digital signals 143U(1)-143U(P) communicated over uplink electrical medium 145U(1)-145U(P), as also illustrated in FIG. 6. Common elements between FIG. 5 and FIG. 6 are illustrated in FIG. 6 with common element numbers. Power may be provided in the downlink and/or uplink electrical medium 145D(1)-145D(P) and/or 145U(1)-145U(P) to the RAUs 132(1)-132(P).

In one embodiment, up to thirty-six (36) RAUs 132 can be supported by the OIMs 128, three RAUs 132 per OIM 128 in the optical fiber-based distributed antenna system 120 in FIG. 5. The optical fiber-based distributed antenna system 120 is scalable to address larger deployments. In the illustrated optical fiber-based distributed antenna system 120, the HEE 124 is configured to support up to thirty six (36) RAUs 132 and fit in 6U rack space (U unit meaning 1.75 inches of height). The downlink operational input power level can be in the range of −15 dBm to 33 dBm. The adjustable uplink system gain range can be in the range of +15 dB to −15 dB. The RF input interface in the RIMs 122 can be duplexed and simplex, N-Type. The optical fiber-based distributed antenna system can include sectorization switches to be configurable for sectorization capability, as discussed in U.S. patent application Ser. No. 12/914,585 filed on Oct. 28, 2010, and entitled "Sectorization In Distributed Antenna Systems, and Related Components and Method," issued as U.S. Pat. No. 8,548,330, which is incorporated herein by reference in its entirety.

In another embodiment, an exemplary RAU 132 may be configured to support up to four (4) different radio bands/carriers (e.g. ATT, VZW, TMobile, Metro PCS: 700LTE/850/1900/2100). Radio band upgrades can be supported by adding remote expansion units over the same optical fiber (or upgrade to MIMO on any single band), as will be described in more detail below starting with FIG. 7. The RAUs 132 and/or remote expansion units may be configured to provide external filter interface to mitigate potential strong interference at 700 MHz band (Public Safety, CH51, 56); Single Antenna Port (N-type) provides DL output power per band (Low bands (<1 GHz): 14 dBm, High bands (>1 GHz): 15 dBm); and satisfies the UL System RF spec (UL Noise Figure: 12 dB, UL IIP3: −5 dBm, UL AGC: 25 dB range).

FIG. 6 is a schematic diagram of providing digital data services and RF communication services to RAUs and/or other remote communications units in the optical fiber-based distributed antenna system 120 of FIG. 6. Common components between FIGS. 5 and 6 and other figures provided have the same element numbers and thus will not be re-described. As illustrated in FIG. 6, a power supply module (PSM) 153 may be provided to provide power to the RIMs 122(1)-122(M) and radio distribution cards (RDCs) 147 that distribute the RF communications from the RIMs 122(1)-122(M) to the OIMs 128(1)-128(N) through RDCs 149. In one embodiment, the RDCs 147, 149 can support different sectorization needs. A PSM 155 may also be provided to provide power to the OIMs 128(1)-128(N). An interface 151, which may include web and network management system (NMS) interfaces, may also be provided to allow configuration and communication to the RIMs 122(1)-122(M) and other components of the optical fiber-based distributed antenna system 120. A microcontroller, microprocessor, or other control circuitry, called a head-end controller (HEC) 157 may be included in HEE 124 (FIG. 7) to provide control operations for the HEE 124.

RAUs, including the RAUs 14, 132 discussed above, contain power-consuming components for transmitting and receiving RF communications signals. In the situation of an optical fiber-based distributed antenna system, the RAUs may contain O/E and E/O converters that also require power to operate. As an example, a RAU may contain a power unit that includes a power supply to provide power to the RAUs locally at the RAU. Alternatively, power may be provided to the RAUs from power supplies provided in remote power units. In either scenario, it may be desirable to provide these power supplies in modular units or devices that may be easily inserted or removed from a power unit. Providing modular power distribution modules allows power to more easily be configured as needed for the distributed antenna system. It may be desired to allow these power distribution modules to be inserted and removed from the power unit without deactivating other power distribution modules providing power to other RAUs. If power to the entire power unit were required to be deactivated, RF communications for all RAUs that receive power from the power unit would be disabled even if the power distribution module inserted and/or removed from the power unit is configured to supply power to only a subset of the RAUs receiving power from the power unit.

In this regard, embodiments disclosed herein include power distribution modules capable of "hot" connection and/or disconnection in distributed antenna systems (DASs). Related components, power units, and methods are also disclosed. By "hot" connection and/or disconnection, it is meant that the power distribution modules can be connected and/or disconnected from a power unit and/or power-consuming components while power is being provided to the power distribution modules. In this regard, it is not required to disable providing power to the power distribution module before connection and/or disconnection of power distribution modules to a power unit and/or power-consuming components. As a non-limiting example, the power distribution modules may be configured to protect against or reduce electrical arching or electrical contact erosion that may otherwise result from "hot" connection and/or disconnection.

Figure 7:
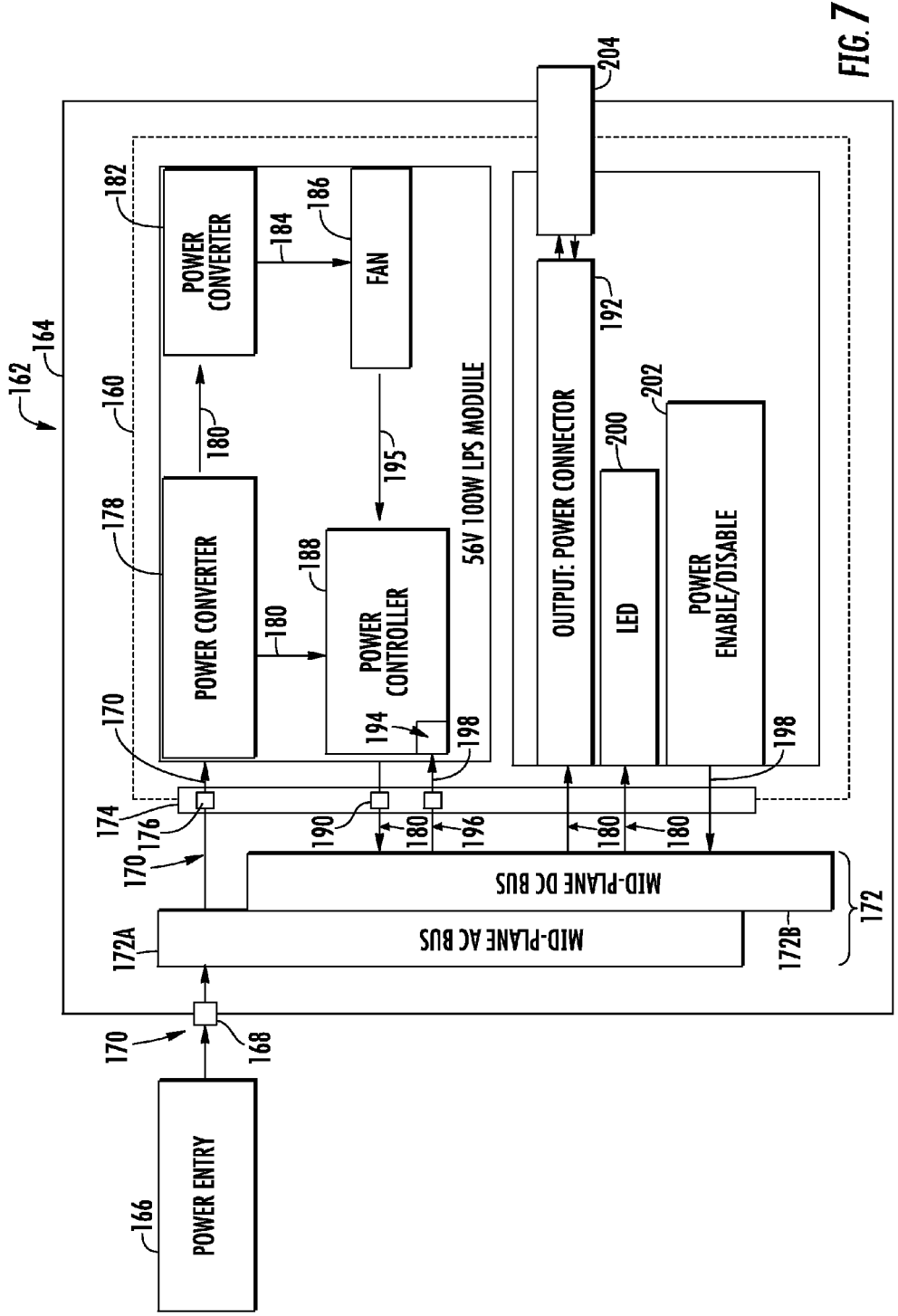
FIG. 7 is a schematic diagram of an exemplary power distribution module that is supported by a power unit and is capable of "hot" connection and/or disconnection.

In this regard, FIG. 7 is a schematic diagram of an exemplary power distribution module 160 that can be employed to provide power to the RAUs 14, 132 or other power-consuming DAS components, including those described above. In this embodiment, the power distribution module 160 is disposed in a power unit 162. The power unit 162 may be the power unit 85 previously described above to remotely provide power to the RAUs 14, 132. The power unit 162 may be comprised of a chassis 164 or other housing that is configured to support power distribution modules 160. The power unit 162 provides support for receiving power from an external power source 166, which may be AC power, to the power unit 162 to then be distributed within the power unit 162 to the power distribution modules 160 disposed therein, as will be described in more detail below. The power unit 162 may be configured to support multiple power distribution modules 162. Each power distribution module 162 may be configured to provide power to multiple RAUs 14, 132.

With continuing reference to FIG. 7, the distribution of power from the external power source 166 to the power distribution modules 160 and from the power distribution modules 160 to output power ports that can be electrically coupled to power-consuming DAS components will now described. In this embodiment, the power unit 162 contains an external input power port 168 disposed in the chassis 164. The external input power port 168 is configured to be electrically coupled to the external power source 166 to supply input power 170 to the external input power connector 168. For example, the external power source 166 may be AC power, and may be either 110 Volts (V) or 220 Volts (V). To distribute the power from the external power source 166 to the power distribution modules 160 disposed in the power unit 162, the power unit 162 contains a midplane interface connector 172. In this embodiment, the midplane interface connector 172 is comprised of an AC connector 172A to carry AC signals, and a DC connector 172B to carry DC signals. The power distribution module 160 contains a complementary connector 174 that can be connected to the midplane interface connector 172 to electrically connect the power distribution module 160 to the power unit 162. For example, the power unit 162 may contain a midplane interface bus that contains a plurality of midplane interface connectors 172 to allow a plurality of power distribution modules 160 to interface with the midplane interface bus.

With continuing reference to FIG. 7, the power distribution module 160 includes an input power port 176 that is configured to receive input power from the external power source 166. The input power port 176 is provided as part of the connector 174 to allow the external power source 166 to be electrically coupled to the input power port 176 and thus to the power distribution module 160. The power distribution module 160 in this embodiment contains an optional power converter 178 to convert the input power 170 from the external power source 166 to DC power 180. In this regard, the power converter 178 is electrically coupled to the input power port 176 to receive the input power 170 from the external power source 166. The power converter 178 converts the input power 170 from the external power source 166 to output power 180, which is DC power in this example. For example, the power converter 178 may convert the input power 170 to 56 VDC output power 180, as a non-limiting example. A secondary power converter 182 may receive the output power 180 and may convert the output power 180 to a second output power 184 at a different voltage, such as 12 VDC for example, to provide power to a cooling fan 186 in the power distribution module 160.

With continuing reference to FIG. 7, the power converter 178 may also distribute the output power 180 to a power controller 188. As will be described in more detail below, the power controller 188 controls whether the output power 180 is distributed to an output power port 190 to be distributed to power-consuming DAS devices electrically coupled to the output power port 190. The output power port 190 in this embodiment is electrically coupled to an output power connector 192 through the connectors 172, 174, as illustrated in FIG. 7. Thus, the output power 180 can be distributed to power-consuming DAS devices by electrical coupling to the output power connector 192 in the power distribution module 160. In this regard, the power controller 188 contains a power enable port 194. The power controller 188 is configured to selectively distribute the output power 180 to the output power port 190 based on a power enable signal 196 provided on a power enable line 198 coupled to the power enable port 194. In this regard, the power controller 188 is configured to distribute the output power 180 to the output power port 190 if the power enable signal 196 communicated on the power enable line 198 indicates to activate power. Activation of power means providing the output power 180 to the output power port 190 to be distributed to power-consuming DAS devices electrically coupled to the output power port 190. When output power 180 is activated and supplied to the output power connector 192, the output power 180 may also be coupled to a light, such as a light emitting diode (LED) 200, to signify that output power 180 is active at the output power connector 192. The power controller 188 is also configured to not distribute the output power 180 to the output power port 190 if the power enable signal 196 communicated on the power enable line 198 indicates to deactivate power. This power controller 188 and enable feature allows the "hot" connection and disconnection of the power distribution module 160 from the power unit 162 in this embodiment, as will be described in more detail below.

With continuing reference to FIG. 7, in this embodiment, one source of the power enable signal 196 is the power disable/enable feature 202. The power enable/disable feature 202 may be a conductor or pin on the power distribution module 160, as will be described in more detail below. The power enable/disable feature 202 may be provided by other means. The power enable/disable feature 202 in this embodiment is configured to close a circuit on the power enable line 198 when an output power connector 204 is connected to the output power connector 192 of the power distribution module 160. When connected, the output power connector 204 will then be electrically coupled to the connector 174 of the power distribution module 160 which is connected to the midplane interface connector 172 of the power unit 162 when the power distribution module 160 is installed. As will be discussed in more detail below, the power enable/disable feature 202 may only be configured to close the circuit on the power enable line 198 until all other conductors of the output power connector 204 are fully electrically coupled to the midplane interface connector 172 via the connector 174. In this manner, electrical arcing between the output power connector 204 and the output power connector 192 may be avoided, because the power controller 188 does not provide output power 180 to the output power port 190 and the output power connector 192 until complete electrical coupling is established between the output power connector 204 and the output power connector 192.

Electrical arcing is a luminous discharge of current that is formed when a strong current jumps a gap in a circuit or between two conductors. If output power 180 is being provided by the power controller 188 to the output power port 190 and output power connector 192 before complete electrical contact is made between the output power connector 204 and the output power connector 192, electrical arcing may occur. Electrical arcing can cause electrical conductor corrosion and/or damage to the power distribution module 160 and/or its components and any power-consuming DAS components connected to the output power connector 192 due to the high voltage and/or discharge.

With continuing reference to FIG. 7, if the output power 180 was being provided to the output power port 190 before a complete electrical connection was made between the output power connector 192 and the output power connector 204, electrical arcing and/or electrical conductor corrosion may occur. Electrical arcing may occur during disconnection of the output power connector 204 from the output power connector 192 due to the output power 180 being "hot" and being actively supplied to the output power connector 192. The power controller 188 herein allows an output power connector 204 to be disconnected from the output power connector 192 while the input power 170 is "hot" or active, because the power enable/disable feature 202 is configured to open the circuit to the power enable line 198 to cause the power controller 188 to not provide the output power 180 to the output power port 190 before the electrical contact is decoupled between the output power connector 204 and the output power connector 192. In a similar regard, the power controller 188 also allows the output power connector 204 to be connected to the output power connector 192 while the input power 170 is "hot" or active, because the power enable/disable feature 202 is configured to close the circuit to the power enable line 198 to enable the power controller 188 to provide the output power 180 to the output power port 190 once complete electrical contact is established between the output power connector 204 and the output power connector 192.

In a similar regard with continuing reference to FIG. 7, the power distribution module 160 is also configured to activate and deactivate providing output power 180 to the output power connector 192 upon installation (i.e., connection) or removal (i.e., disconnection) of the power distribution module 160 from the power unit 162. More specifically, the power enable/disable feature 202 is configured to only close the circuit on the power enable line 198 to enable the power controller 188 to provide output power 180 until all other conductors of the connector 174 of the power distribution module 160 are completely coupled to the midplane interface connector 172 during installation of the power distribution module 160 in the power unit 162. In this manner, electrical arcing between the output power connector 204 and the output power connector 192 may be avoided when the power distribution module 160 is installed in the power unit 162 when input power 170 is "hot." This is because the power controller 188 does not provide output power 180 to the output power port 190 and the output power connector 204 until complete electrical coupling is established between the connector 174 of the power distribution module 160 and the midplane interface connector 172. This reduces or avoids the risk of electrical arcing if a load is placed on the output power connector 204 connected to the output power connector 192 when the power distribution module 160 is connected to and disconnected from the power unit 162 when input power 170 is active.

Also, the power enable/disable feature 202 is configured to open the circuit on the power enable line 198 to disable output power 180 from being provided by the output power port 190 during removal or disconnection of the power distribution module 160 from the power unit 162. The power enable/disable feature 202 is configured to open the circuit on the power enable line 198 to disable output power 180 before the connector 174 of the power distribution module 160 begins to decouple from the midplane interface connector 172. In this manner, electrical arcing between the output power connector 204 and the output power connector 192 may be avoided if the power distribution module 160 is removed while input power 170 is "hot." This is because the power controller 188 disables output power 180 to the output power port 190 and the output power connector 204 before electrical decoupling starts to being between the connector 174 of the power distribution module 160 and the midplane interface connector 172 during removal of the power distribution module 160. This reduces or avoids the risk of electrical arcing if a load is placed on the output power connector 204 connected to the output power connector 192 when the power distribution module 160 is disconnected from the power unit 162 when input power 170 is active.

Also, with reference to FIG. 7, the fan 186 may be configured to provide diagnostic or other operational data 195 to the power controller 188. For example, the power controller 188 may be configured to disable providing output power 180 if a fault or other error condition is reported by the fan 186 to the power controller 188.

Figure 8:
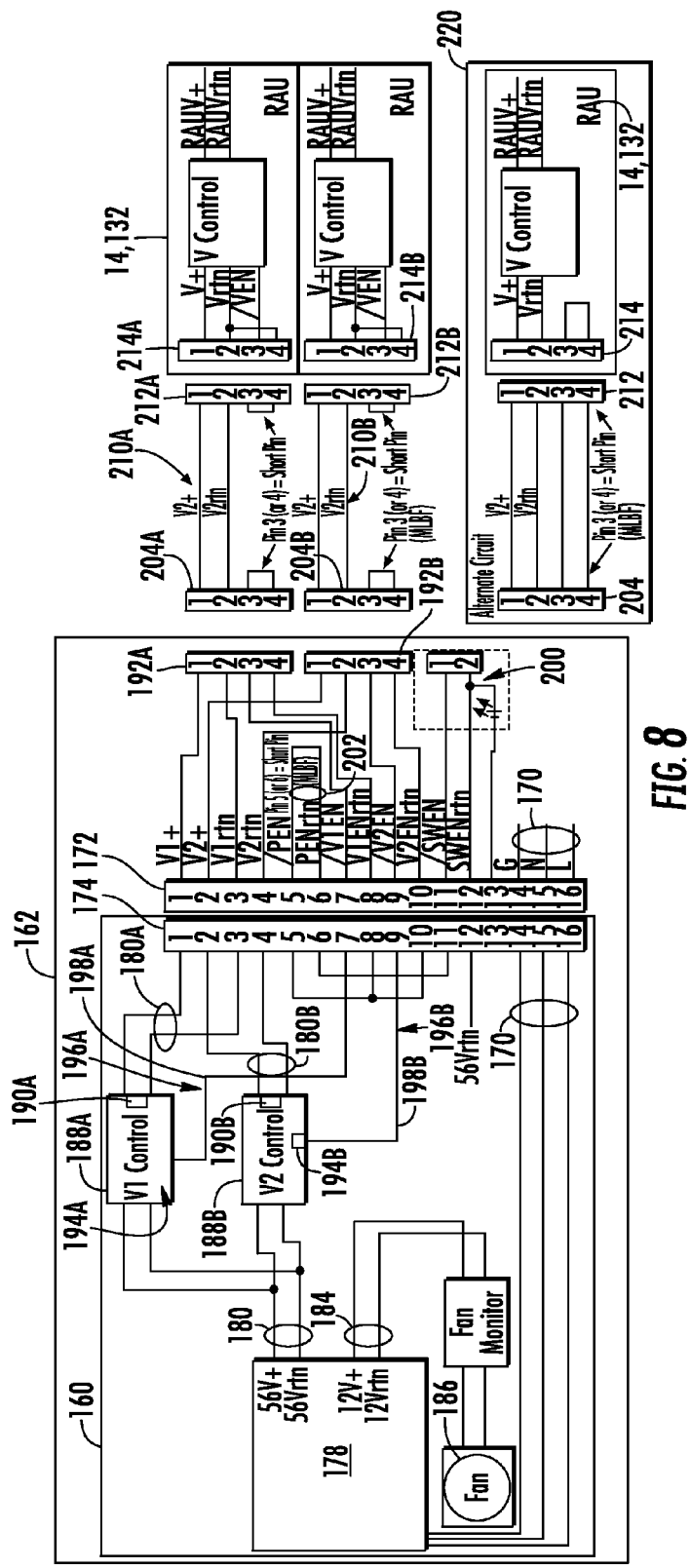
FIG. 8 is a schematic diagram of internal components of the power distribution module in FIG. 7 to allow "hot" connection and/or disconnection of the power distribution module from a power unit and remote antenna units (RAUs) in a distributed antenna system.

FIG. 8 is a schematic diagram of exemplary internal components of the power distribution module 160 in FIG. 7 and the power unit 162 to allow "hot" connection and/or disconnection of the power distribution module 160 from the power unit 162 and remote antenna units (RAUs) 14, 132 in a distributed antenna system. Common element numbers between FIG. 7 and FIG. 8 signify common elements and functionality. Only one power distribution module 160 is shown, but more than one power distribution modules 160 may be provided in the power unit 162. As shown in FIG. 8, there are two output power connectors 192A, 192B that allow two power cables 210A, 210B, via their output power connectors 204A, 204B, to be connected to the output power connectors 192A, 192B to provide power to two RAUs 14, 132. Alternatively, one RAU 14, 132 requiring higher power could be connected to both output power connectors 204A, 204B. The power distribution module 160 in this embodiment is configured to distribute power to multiple RAUs 14, 132. Output connectors 212A, 212B are disposed on opposite ends of the power cables 210A, 210B from output power connectors 204A, 204B. Output connectors 212A, 212B are configured to be connected to RAU power connectors 214A, 214B to provide power to the RAUs 14, 132. The power cables 210A, 210B are configured such that two conductors (pins 3 and 4 as illustrated) are shorted when the output connectors 212A, 212B are electrically connected to RAU power connectors 214A, 214B in the RAUs 14, 132. The conductors in the RAU power connectors 214A, 214B corresponding to pins 3 and 4 are shorted inside the RAU 14, 132.

Figure 9:
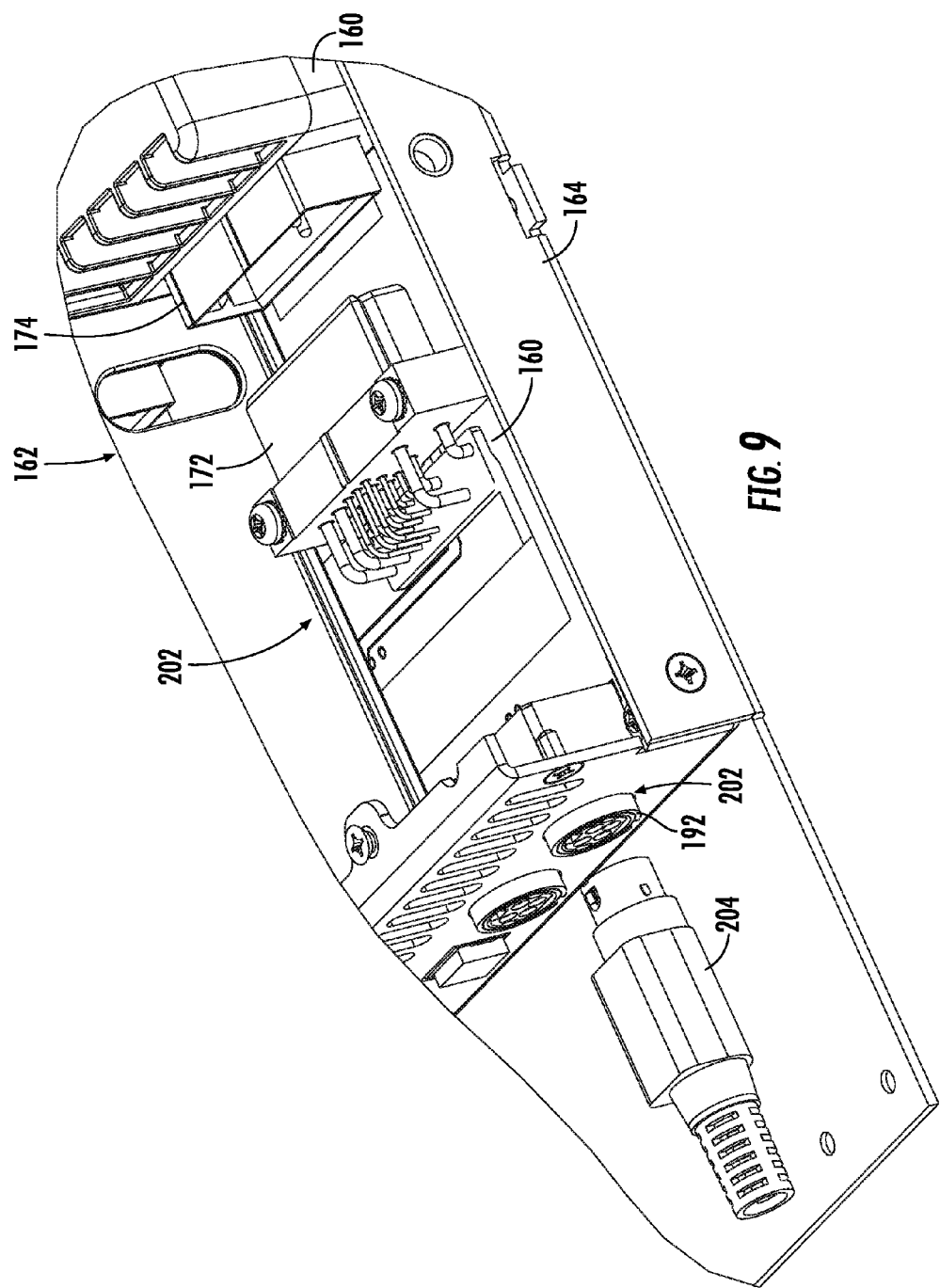
FIG. 9 is a side perspective view of an input power connector in the power distribution module of FIG. 7 configured to be inserted into an input power connector in a power unit to receive input power from the power unit, and an output power connector of a power cable configured to be inserted into an output power connector in the power distribution module of FIG. 7 to distribute output power from the power distribution module through the output power connector and power cable to at least one power-consuming DAS device.
Figure 10A:
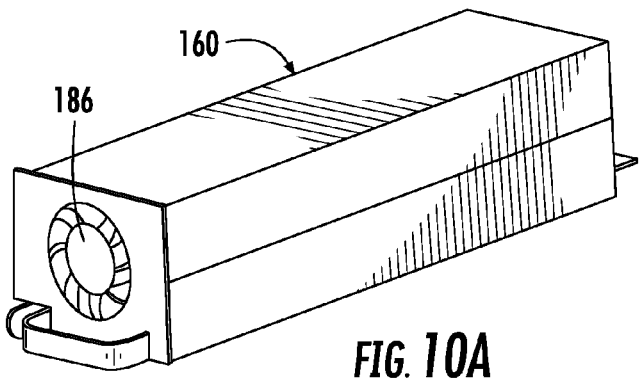
FIG. 10A illustrates a front, side perspective view of an exemplary power distribution module with a cover installed.
Figure 10B:
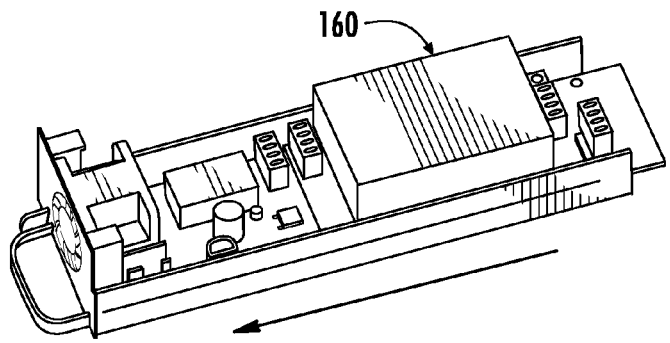
FIG. 10B illustrates a front, side perspective view of the power distribution module in FIG. 10A with the cover removed.
Figure 10C:
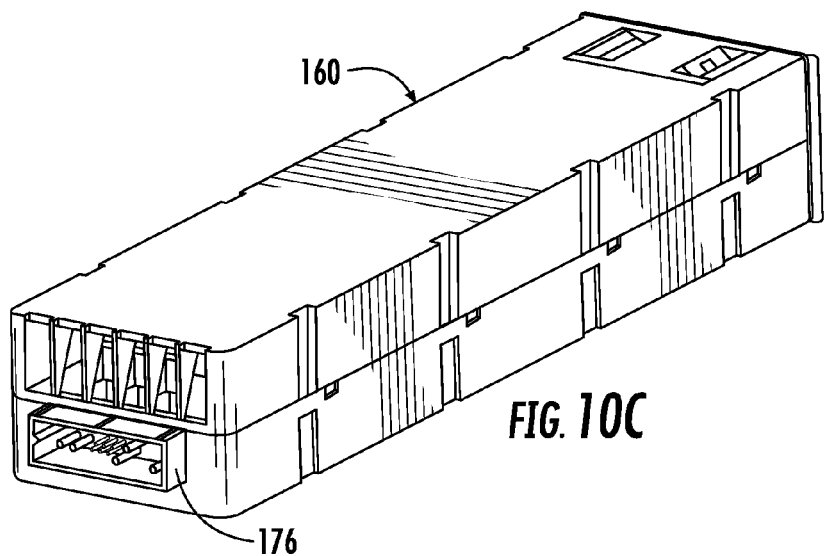
FIG. 10C illustrates a rear, side perspective view of the power distribution module in FIG. 10A.

In this regard, FIG. 9 is a side perspective view of an output power connector 204 being connected to the output power connector 192 of the power distribution module 160. FIG. 9 also shows the connector 174 of power distribution module 160 about to be inserted into the midplane interface connector 172 of the power unit 162 to couple input power 170 to the power distribution module 160 to be distributed through the output power connector 192 to the output power connector 204 to least one power-consuming DAS device. FIG. 10A illustrates a front, side perspective view of an exemplary power distribution module 160 with a cover installed. FIG. 10B illustrates a front, side perspective view of the power distribution module 160 in FIG. 10A with the cover removed. FIG. 10C illustrates a rear, side perspective view of the power distribution module 160 in FIG. 10A.

With continuing reference to FIG. 8, when the output power connectors 204A, 204B are electrically connected to the power cables 210A, 210B, the short created between pins 3 and 4 in the RAU power connectors 214A, 214B cause pins 3 and 4 to be shorted in the output power connectors 204A, 204B coupled to the midplane interface connector 172 and the connector 174 of the power distribution module 160, and the output power connectors 192A, 192B. This is a power enable/disable feature 202A. In this regard, the power enable ports 194A, 194B via power enable lines 198A, 198B are activated, thereby activating the power controllers 188A, 188B to provide output power 180 to the connector 174 through midplane interface connector 172 and to the RAUs 14, 132 via the power cables 210A, 210B. When the output power connectors 204A, 204B or output connectors 212A, 212B are disconnected, pins 3 and 4 on the output power connectors 192A, 192B are not short circuited. This causes the power enable ports 194A, 194B via power enable lines 198A, 198B to be deactivated, thereby causing the power controllers 188A, 188B to deactivate output power 180 to the connector 174 through midplane interface connector 172 and the output power connectors 192A, 192B, which may be electrically connected to the power cables 210A, 210B. In this regard, connection and disconnection of the RAUs 14, 132 to the output power connectors 192A, 192B causes the power controllers 188A, 188B to activate and deactivate output power 180, respectively.

With continuing reference to FIG. 8, an alternative circuit configuration 220 may be provided. Instead of pins 3 and 4 being shorted together in the power cables 210A, 210B, pins 3 and 4 may be shorted in the RAU power connectors 214A, 214B of the RAUs 14, 132. This will cause a short circuit between pins 3 and 4 in the power cables 210A, 210B when the output connectors 212A, 212B of the power cables 210A, 210B are connected to the RAU power connectors 214A, 214B of the RAUs 114, 132. The alternative circuit configuration 220 provides extra conductors in the power cables 210A, 210B that can increase cost in the power cable 210A, 210B. When connected, the power enable ports 194A, 194B via power enable lines 198A, 198B are activated, thereby activating the power controllers 188A, 188B to provide output power 180 to the connector 174 through midplane interface connector 172 and to the RAUs 14, 132 via the power cables 210A, 210B. When the output power connectors 204A, 204B or output connectors 212A, 212B are disconnected, pins 3 and 4 on the output power connectors 192A, 192B are not short circuited. This causes the power enable ports 194A, 194B via power enable lines 198A, 198B to be deactivated, thereby causing the power controllers 188A, 188B to deactivate output power 180 to the connector 174 through midplane interface connector 172 and the output power connectors 192A, 192B, which may be electrically connected to the power cables 210A, 210B. In this regard, connection and disconnection of the RAUs 14, 132 to the output power connectors 192A, 192B causes the power controllers 188A, 188B to activate and deactivate output power 180, respectively.

With continuing reference to FIG. 8, output power 180A, 180B is enabled by the power controllers 188A, 188B when the power distribution module 160 connector 174 is connected to midplane interface connector 172 in the power unit 162. In this regard, a short is created between pins 11 and 12 in the midplane interface connector 172 when the power distribution module 160 connector 174 is connected to the midplane interface connector 172 through the power enable/disable feature 202B. The power enable ports 194A, 194B via power enable lines 198A, 198B are activated, thereby activating the power controllers 188A, 188B to provide output power 180 to the connector 174 through midplane interface connector 172 and to the RAUs 14, 132 via the power cables 210A, 210B. Similarly, output power 180A, 180B is disabled by the power controllers 188A, 188B when the power distribution module 160 connector 174 is disconnected from midplane interface connector 172 in the power unit 162. In this regard, pins 11 and 12 are no longer shorted. This causes the power enable ports 194A, 194B via power enable lines 198A, 198B to be deactivated, thereby causing the power controllers 188A, 188B to deactivate output power 180 to the connector 174 through midplane interface connector 172 and the output power connectors 192A, 192B, which may be electrically connected to the power cables 210A, 210B. In this regard, connection and disconnection of the power distribution module 160 to the power unit 162 causes the power controllers 188A, 188B to activate and deactivate output power 180, respectively.

The power converter 178 can be provided to produce any voltage level of DC power desired. In one embodiment, the power converter 178 can produce relatively low voltage DC current. A low voltage may be desired that is power-limited and Safety Extra Low Voltage (SELV) compliant, although such is not required. For example, according to Underwriters Laboratories (UL) Publication No. 60950, SELV-compliant circuits produce voltages that are safe to touch both under normal operating conditions and after faults. In this embodiment, two power controllers 188A, 188B are provided so no more than 100 Watts (W) in this example are provided over output power ports 190A, 190B to stay within the Underwriters Laboratories (UL) Publication No. 60950, and provide a SELV-compliant circuit. The 100 VA limit discussed therein is for a Class 2 DC power source, as shown in Table 11(B) in NFPA 70, Article 725. Providing a SELV compliant power converter 178 and power unit 162 may be desired or necessary for fire protection and to meet fire protection and other safety regulations and/or standards. The power converter 178 is configured to provide up to 150 W of power in this example. The 150 W is split among the output power ports 190A, 190B.

Figure 11:
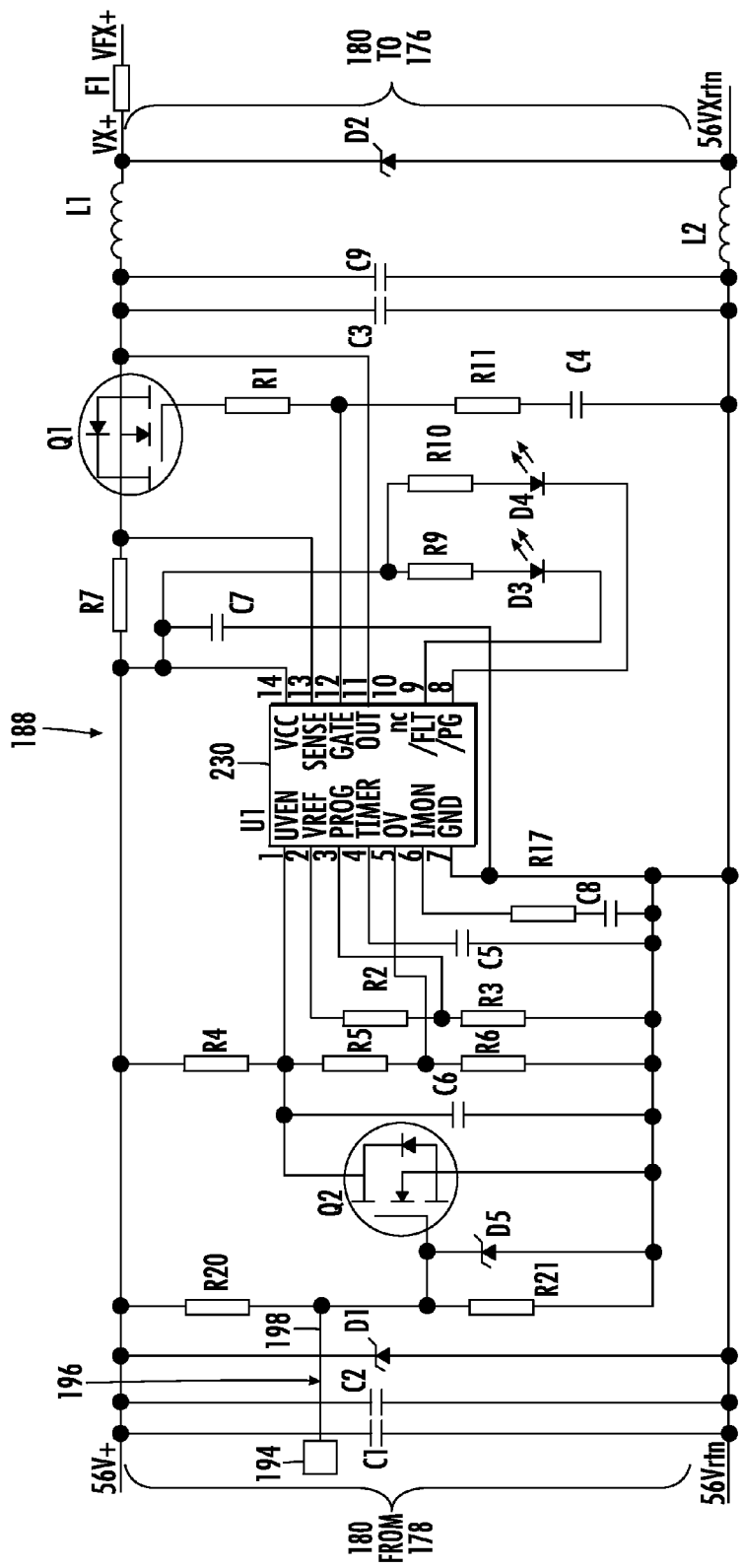
FIG. 11 is a schematic diagram of the power controller in the power distribution module in FIG. 8.

FIG. 11 is a schematic diagram of an exemplary power controller 188 that may be provided in the power distribution module 160 in FIG. 7. Common element numbers between FIG. 11 and FIG. 7 indicate common elements and thus will not be re-described. As illustrated in FIG. 11, an integrated circuit (IC) chip 230 is provided to control wherein output power 180 from the power converter 178 will be provided to the connector 174 of the power distribution module 160 configured to be connected to the midplane interface connector 172 of the power unit 162.

To provide for "hot" connection of the power distribution module 160 to the power unit 162, and more particularly the connector 174 to the midplane interface connector 172, the power controller 188 should not enable output power 180 until complete electrical contact is made between the conductors of the connector 174 and the midplane interface connector 172. Otherwise, electrical arcing may occur. To provide for "hot" disconnection of the power distribution module 160 to the power unit 162, the power controller 188 should disable output power 180 before complete electrical contact is decoupled between the conductors of the connector 174 and the midplane interface connector 172. Similarly, to provide for "hot" connection of power-consuming DAS devices to the output power connector 192 of a power distribution module 160, it is important that the power controller 188 not enable output power 180 until complete electrical contact is made between the output power connector 192 and the output power connector 204. Otherwise, electrical arcing may occur. To provide for "hot" disconnection of the power distribution module 160 to the power unit 162, the power controller 188 should disable output power 180 before complete electrical contact is decoupled between the conductors of the output power connector 192 and the output power connector 204.

Figure 12:
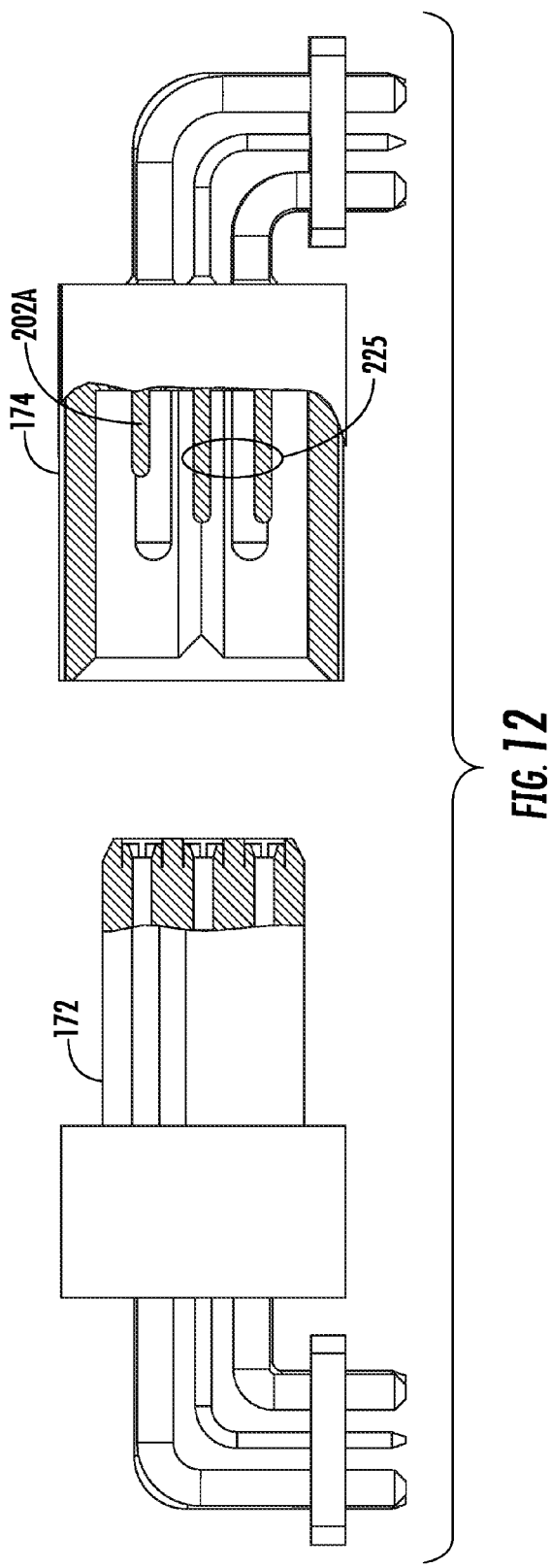
FIG. 12 is a side view of input power receptacles of the input power connector in the power distribution module in FIG. 8 aligned to be connected to input power ports in an input power connector of the power unit in FIG. 8.
Figure 13:
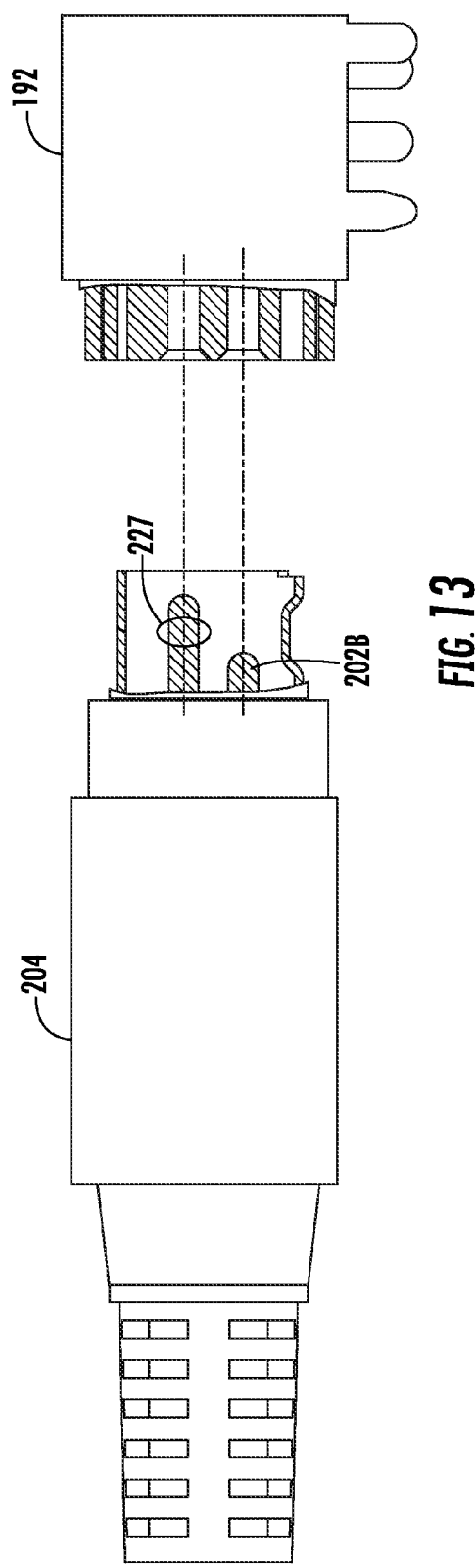
FIG. 13 is a side view of output power pins of the output power connector of the power cable in FIG. 8 aligned to be connected to output power receptacles of the output power connector in the power distribution module in FIG. 8.

In this regard, short conductor pins are provided in the midplane interface connector 172 and the output power connector 204 that are configured to be coupled to the power enable line 198 when contact is established. This is illustrated in FIGS. 12 and 13. FIG. 12 is a side view of the midplane interface connector 172 that includes a short conductor pin 202A, which is the power enable/disable feature 202 in this embodiment. FIG. 13 is a side view of output power pins of the output power connector 204 of the power cable 210 aligned to be connected to the output power connector 192 of the power distribution module 160.

With reference to FIG. 12, the interface connector 174 includes other conductors 225 that are longer than the short conductor pin 202A. Thus, when the midplane interface connector 172 is connected to the connector 174, electrical contact is fully established to the other conductors 225 before the short conductor pin 202A enables the power enable line 198 to enable the power controller 188 to distribute the output power 180. Thus, electrical arcing can be avoided when "hot" connection is made between the midplane interface connector 172 and the connector 174 of the power distribution module 160. Similarly, to provide for "hot" disconnection, the short conductor pin 202A will electrically decouple from the connector 174 first before electrical decoupling occurs to the other conductors 225. Thus, the power controller 188 will disable output power 180 before electrical contact is decoupled between the other conductors 225 and the connector 174. Thus, electrical arcing can be avoided when "hot" disconnection is made between the midplane interface connector 172 and the connector 174 of the power distribution module 160. The short conductor pin 202A could be reversed and disposed in the connector 174 of the power distribution module 160 output power connector 192 as opposed to the midplane interface connector 172.

With reference to FIG. 13, a similar arrangement is provided. Therein the output power connector 204 includes other conductors 227 that are longer than the short conductor pin 202B. Thus, when the output power connector 204 is connected to the output power connector 192, electrical contact is fully established to the other conductors 227 before the short conductor pin 202B enables the power enable line 198 to enable the power controller 188 to distribute the output power 180. Thus, electrical arcing can be avoided when "hot" connection is made between the output power connector 204 and the output power connector 192 of the power distribution module 160. Similarly, to provide for "hot" disconnection, the short conductor pin 202B will electrically decouple from the output power connector 192 first before electrical decoupling occurs to the other conductors 227. Thus, the power controller 188 will disable output power 180 before electrical contact is decoupled between the other conductors 227 and the output power connector 192. Thus, electrical arcing can be avoided when "hot" disconnection is made between the output power connector 204 and the output power connector 192 of the power distribution module 160. The short conductor pin 202B could be reversed and disposed in the output power connector 192 as opposed to the output power connector 204.

Figure 14:
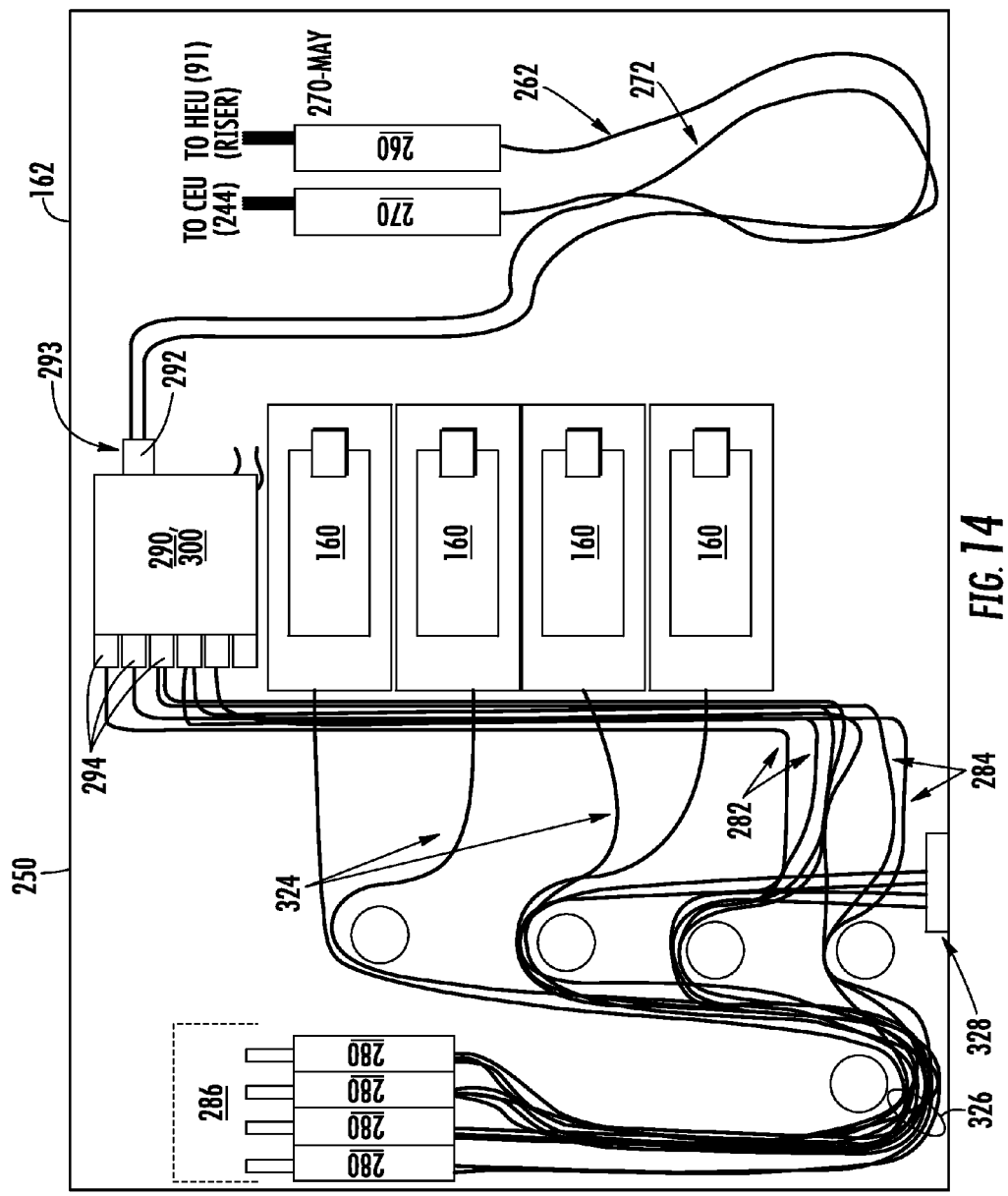
FIG. 14 is a schematic diagram of an exemplary power unit configured to support one or more power distribution modules to provide power to RAUs in a distributed antenna system.

FIG. 14 is a schematic diagram of an exemplary power unit 162 configured to support one or more power distribution modules 160 to provide power to RAUs 14, 132 in a distributed antenna system. In this regard, FIG. 14 is a schematic top cutaway view of a power unit 162 that may be employed in the exemplary RoF distributed communication system. The power unit 162 provides power to remote units, and connectivity to a first central unit, in a manner similar to the power unit 85 illustrated in FIG. 3. The power unit 162, however, may also provide connectivity between RAUs 14, 132 and a second central unit 244 (not illustrated). The second central unit 244 can be, for example, a unit providing Ethernet service to the remote units. For the purpose of this embodiment, the first central unit will be referred to as the HEU 91, and the second central unit will be referred to as a central Ethernet unit, or CEU 244. The CEU 244 can be collocated with the power unit 162, as for example, in an electrical closet, or the CEU 244 can be located with or within the HEU 91.

According to one embodiment, if Ethernet or some other additional service (e.g. a second cellular communication provider) is to be provided over the system 10, four optical fibers (two uplink/downlink fiber pairs) may be routed to each remote unit location. In this case, two fibers are for uplink/downlink from the HEU 91 to the remote unit, and two fibers are for uplink/downlink from the CEU 244. One or more of the remote units may be equipped with additional hardware, or a separate, add-on module designed for Ethernet transmission to which the second fiber pair connects. A third fiber pair could also be provided at each remote unit location to provide additional services.

As illustrated in FIG. 14, the power unit 162 may be provided in an enclosure 250. The enclosure 250 may be generally similar in function to the wall mount enclosure, except that one or more sets of furcations in the power unit 162 can be internal to the enclosure 250. One or more power units 162 can be located on a floor of an office building, a multiple dwelling unit, etc. to provide power and connectivity to remote units on that floor. The exemplary power unit 162 is intended as a 1U rack mount configuration, although the power unit 162 may also be configured as a 3U version, for example, to accommodate additional remote units.

A furcation 260, located inside the enclosure 250, of the riser cable 84 (e.g., FIG. 3A) breaks pairs of optical fibers from the riser cable 84 that are connected at an uplink end to the HEU 91, to provide optical communication input links to the HEU 91. The furcation 260 can be a Size 2 Edge™

Plug furcation, Part 02-013966-001 available from Corning Cable Systems LLC of Hickory N.C. If the CEU 244 is located with the HEU 91, optical fibers connecting the CEU 244 to the power unit 162 can be included in the riser cable 84. A furcation 270 breaks fiber pairs from the CEU 244 to provide optical communication input links to the CEU 244. The furcation 270 can be a Size 2 Edge™ Plug furcation, Part 02-013966-001 available from Corning Cable Systems LLC.

The optical communication input links from the HEU 91 and the CEU 244 are downlink and uplink optical fiber pairs to be connected to the remote units. In this embodiment, the furcated leg contains eight (8) optical fiber pairs to provide connections from the CEU 244 and HEU 91 to up to four (4) remote units, although any number of fibers and remote units can be used. The legs are connected to the power unit 162 at furcations 280, which can be arranged as two rows of four 2-fiber connectors on one face of the enclosure 250. The illustrated furcations 280 are internally mounted in the enclosure 250. In an alternative embodiment, the furcations 280 can be mounted on a tray 286 that is mounted to an exterior of the enclosure 250.

For communication between the HEU 91 and the remote units, the furcated leg 262 from the furcation 260 can be pre-connectorized with a fiber-optic connector to facilitate easy connection to a first adapter module 290 within the power unit 162. The first adapter module 290 includes a multi-fiber connector 292 that receives the connector of the furcated leg 262. The connector 292 can be, for example, a 12-fiber MTP connector. A series of six 2-fiber connectors 294, for example, at the other side of the first adapter module 290, connects to fiber pairs 282 from each furcation 280. Each fiber pair 282 can be connectorized with a 2-fiber connector that connects to one of six connectors 294 of the first adapter module 290. In this arrangement, the first adapter module 290 has the capacity to receive twelve fibers at the connector 292, and six separate connectorized fiber pairs 282. This exemplary arrangement allows for optical communication between six remote units and the HEU 91, although only four such connections are shown in the illustrated embodiment. The first adapter module 290 can be, for example, a 12/F LC EDGE™ Module/07-016841 for riser connection available from Corning Cable Systems LLC.

For communication between the CEU 244 and the remote units, or an add-on module of a remote unit, etc., the furcated leg 272 from the furcation 270 can be pre-connectorized with a fiber-optic connector to facilitate easy connection to a second adapter module 300 within the power unit 162. In the illustrated embodiment, the second adapter module 300 is directly beneath the first adapter module 290, and thus is not visible in FIG. 14. The second adapter module 300 includes a multi-fiber connector 293 that receives the connector of the leg 272. The connector 293 can be, for example, a 12-fiber MTP connector. A series of six 2-fiber connectors, for example, at the other side of the second adapter module 300, connects to fiber pairs 284 from each furcation 280. Each fiber pair 284 can be connectorized with a 2-fiber connector that connects to one of six connectors of the second adapter module 300. In this arrangement, the second adapter module 300 has the capacity to receive twelve fibers at the connector 293, and six separate connectorized fiber pairs 284. This arrangement allows for optical communication between, for example, six Ethernet modules that are collocated or within respective remote units, and the CEU 244, although only four such connections are shown in the illustrated embodiment. The second adapter module 300 can be, for example, a 12/F LC EDGE™ Module/07-016841 for riser connection available from Corning Cable Systems LLC.

One or more power distribution modules 160 can be included in the enclosure 250. According to one embodiment, one power distribution module 160 can be connected to each remote unit by a pair of electrical conductors. Electrical conductors include, for example, coaxial cable, twisted copper conductor pairs, etc. Each power distribution module 160 is shown connected to a twisted pair of conductors 324. The power distribution modules 160 plug into a back plane and the conductors that power the remote units connect to the back plane with a separate electrical connector from the optical fibers, although hybrid optical/electrical connectors could be used. Each cable extending to remote units can include two fibers and two twisted copper conductor pairs, although additional fibers and electrical conductors could be included.

The power distribution modules 160 are aligned side-by-side in the enclosure 250. One power distribution module 160 can be assigned to each remote unit, based upon power requirements. If an add-on module, such as an Ethernet module, is included at a remote unit, a second power distribution module 160 can be assigned to power the add-on module. If the remote unit and add-on module power budgets are low, a single power distribution module 160 may suffice to power that location. The allocation of power and optical connectivity is accordingly adaptable depending upon the number and power requirements of remote units, additional modules, and hardware, etc. The power distribution modules 160 can be connected to a power bus that receives local power at the power unit 162 location.

As previously discussed, the power distribution modules 160 may include a fan 186 that is powered by the module 160. Each power distribution module 160 can have two output plugs, to allow for powering of high or low power remote units. In FIG. 14, unused twisted conductor pairs 326 are parked at location 328. The conductor pairs 326 could be used to power Power-over-Ethernet applications, etc., although that might require fewer remote units to be used, or additional power distribution modules 160.

The illustrated power distribution modules 160 can have a power output of 93-95 W. The power distribution modules can operate without fans, but the power ratings may drop, or a larger enclosure space may be required to ensure proper cooling. If no fan is used, the power ratings can drop from, for example, 100 W to 60-70 W. UL requirements can be followed that limit the power distribution to 100 VA per remote unit array. In an alternate 1U module configuration, the power unit 162 could have six power distribution modules 160 and no adapter modules. The modules could supply, for example, remote units with greater than 80 W loads. In an alternate 3U module configuration, the power unit 162 could have twelve power distribution modules 160 and can support twelve remote units.

The power unit 162 discussed herein can encompass any type of fiber-optic equipment and any type of optical connections and receive any number of fiber-optic cables or single or multi-fiber cables or connections. The power unit 162 may include fiber-optic components such as adapters or connectors to facilitate optical connections. These components can include, but are not limited to the fiber-optic component types of LC, SC, ST, LCAPC, SCAPC, MTRJ, and FC. The power unit 162 may be configured to connect to any number of remote units. One or more power supplies either contained within the power unit 162 or associated with the power unit 162 may provide power to the power distribution module in the power unit 162. The power distribution module can be configured to distribute power to remote units with or without voltage and current protections and/or sensing. The power distribution module contained in the power unit 162 may be modular where it can be removed and services or permanently installed in the power unit 162.

Figure 15:
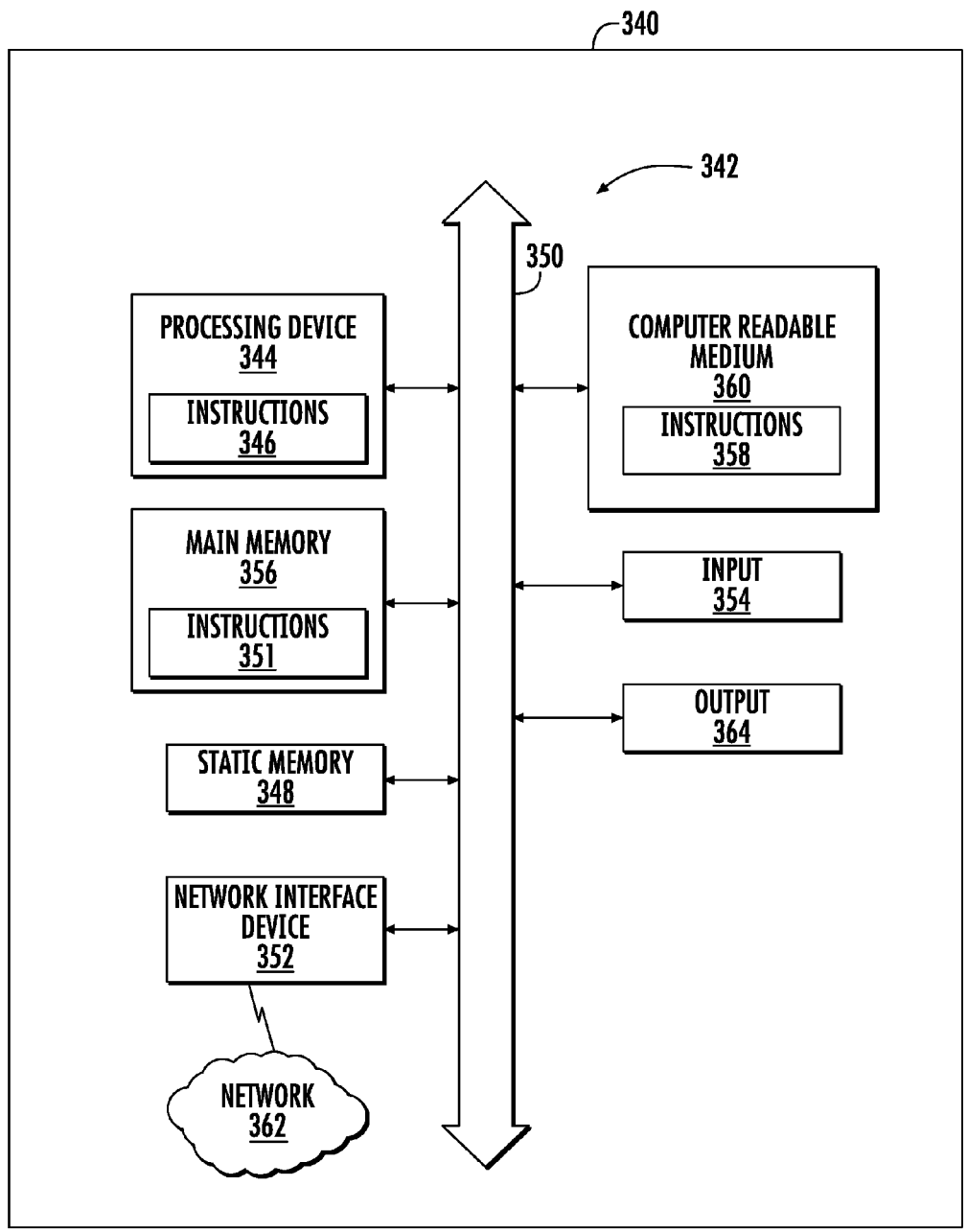
FIG. 15 is a schematic diagram of a generalized representation of an exemplary computer system that can be included in the power distribution modules disclosed herein, wherein the exemplary computer system is adapted to execute instructions from an exemplary computer-readable media.

FIG. 15 is a schematic diagram representation of additional detail regarding an exemplary computer system 340 that may be included in the power distribution module 160 and provided in the power controller 188. The computer system 340 is adapted to execute instructions from an exemplary computer-readable medium to perform power management functions. In this regard, the computer system 400 may include a set of instructions for causing the power controller 188 to enable and disable coupling of power to the output power port 190, as previously described. The power controller 188 may be connected (e.g., networked) to other machines in a LAN, an intranet, an extranet, or the Internet. The power controller 188 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The power controller 188 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 340 of the power controller 188 in this embodiment includes a processing device or processor 344, a main memory 356 (e.g., read-only memory (ROM), flash memory, dynamic random access memory (DRAM) such as synchronous DRAM (SDRAM), etc.), and a static memory 348 (e.g., flash memory, static random access memory (SRAM), etc.), which may communicate with each other via the data bus 350. Alternatively, the processing device 344 may be connected to the main memory 356 and/or static memory 348 directly or via some other connectivity means. The processing device 344 may be a controller, and the main memory 356 or static memory 348 may be any type of memory, each of which can be included in the power controller 188.

The processing device 344 represents one or more general-purpose processing devices such as a microprocessor, central processing unit, or the like. More particularly, the processing device 344 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 344 is configured to execute processing logic in instructions 346 for performing the operations and steps discussed herein.

The computer system 340 may further include a network interface device 352. The computer system 340 also may or may not include an input 354 to receive input and selections to be communicated to the computer system 340 when executing instructions. The computer system 340 also may or may not include an output 364, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 340 may or may not include a data storage device that includes instructions 358 stored in a computer-readable medium 360. The instructions 358 may also reside, completely or at least partially, within the main memory 356 and/or within the processing device 344 during execution thereof by the computer system 340, the main memory 356 and the processing device 344 also constituting computer-readable medium. The instructions 358 may further be transmitted or received over a network 362 via the network interface device 352.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the distributed antenna systems could include any type or number of communications mediums, including but not limited to electrical conductors, optical fiber, and air (i.e., wireless transmission). The distributed antenna systems may distribute any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims.

What is claimed is:

1. A power distribution module for distributing power in a distributed antenna system, comprising:
   an input power port configured to receive input power from an external power source;
   at least one output power port configured to receive output power and distribute the output power to at least one distributed antenna system (DAS) power-consuming device electrically coupled to the at least one output power port; and
   at least one power controller comprising a power enable port, the at least one power controller configured to selectively distribute the output power based on the input power to the at least one output power port based on a power enable signal coupled to the power enable port.

2. The power distribution module of claim 1, further comprising at least one power converter electrically coupled to the input power port, the at least one power converter configured to:
receive input power from the external power source when the external power source is electrically connected to the input power port;
convert the input power to the output power; and
distribute the output power to at least one power controller.

3. The power distribution module of claim 1, wherein the at least one power controller is configured to distribute the output power to the at least one output power port if the power enable signal coupled to the power enable port indicates to activate power.

4. The power distribution module of claim 1, wherein the at least one power controller is configured to not distribute the output power to the at least one output power port if the power enable signal coupled to the power enable port indicates to deactivate power.

5. The power distribution module of claim 1, wherein the at least one output power port is comprised of a plurality of output power ports configured to distribute power to a plurality of power-consuming DAS components electrically coupled to the plurality of output power ports.

6. The power distribution module of claim 1, wherein the input power port comprises at least one input power conductor electrically coupled to the at least one power converter and at least one input power enable conductor electrically coupled to the power enable port.

7. The power distribution module of claim 6, wherein the at least one input power conductor is configured to receive the input power from the external power source when the external power source is coupled to the input power port.

8. The power distribution module of claim 6, wherein the at least one input power enable conductor is configured to receive a power enable signal.

9. The power distribution module of claim 6, wherein the at least one input power conductor is comprised of at least one input power connector receptacle, and the at least one input power enable conductor is comprised of at least one input power enable receptacle.

10. The power distribution module of claim 6, wherein the at least one input power conductor is comprised of at least one input power connector pin, and the at least one input power enable conductor is comprised of at least one input power enable pin.

11. The power distribution module of claim 10, wherein the at least one input power enable pin is shorter in length than the at least one input power connector pin, such that when the at least one input power conductor is electrically coupled to the external power source, an electrical connection is established to the at least one input power connector pin before an electrical connection is established to the at least one input power enable pin.

12. The power distribution module of claim 1, wherein the at least one output power port comprises at least one output power conductor electrically coupled to the at least one power converter and at least one output power enable conductor electrically coupled to the power enable port.

13. The power distribution module of claim 12, wherein the at least one output power conductor is configured to receive the output power from the at least one power controller when the external power source is coupled to the input power port and the power enable port receives the power enable signal indicating to distribute power.

14. The power distribution module of claim 13, wherein the at least one output power enable conductor is configured to receive a power enable signal.

15. The power distribution module of claim 12, wherein the at least one output power conductor is comprised of at least one output power connector receptacle, and the at least one output power enable conductor is comprised of at least one output power enable receptacle.

16. The power distribution module of claim 12, wherein the at least one output power conductor is comprised of at least one output power connector pin, and the at least one output power enable conductor is comprised of at least one output power enable pin.

17. The power distribution module of claim 16, wherein the at least one output power enable pin is shorter in length than the at least one output power connector pin, such that when the at least one output power conductor is electrically coupled to the at least one DAS power-consuming device, an electrical connection is established to the at least one output power connector pin before an electrical connection is established to the at least one output power enable pin.

18. The power distribution module of claim 1, wherein the at least one DAS power-consuming device is comprised of at least one remote antenna unit (RAU).

19. The power distribution module of claim 2, wherein the at least one power converter is configured to convert alternating current (AC) input power from the external power source to direct current (DC) output power.

20. A method of distributing power from a power distribution module to at least one power-consuming distributed antenna system (DAS) component in a DAS, comprising:
receiving input power from an external power source electrically connected to an input power port;
selectively distributing from at least one power controller, output power based on the input power to at least one output power port based on a power enable signal coupled to a power enable port on the at least one power controller; and
distributing the output power from the at least one output power port to the at least one power-consuming DAS component electrically coupled to the at least one output power port.

21. The power distribution module of claim 1, further comprising a plurality of output power connectors and wherein:
the input power port is part of a connector;
the power enable port is coupled to a power enable line; and
a source of the power enable signal is configured to close a circuit on the power enable line until each conductor of the plurality of output power connectors of the power distribution module is electrically coupled to a midplane interface connector of a power unit of the distributed antenna system via the connector, wherein the connector is complementary with the midplane interface connector.

* * * * *